United States Patent
Nakamura et al.

(10) Patent No.: US 9,180,782 B2
(45) Date of Patent: Nov. 10, 2015

(54) NON-CONTACT POWER RECEIVING APPARATUS, NON-CONTACT POWER TRANSMITTING APPARATUS, AND NON-CONTACT POWER TRANSMITTING/RECEIVING SYSTEM

(75) Inventors: Toru Nakamura, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 14/122,091

(22) PCT Filed: Jun. 20, 2011

(86) PCT No.: PCT/JP2011/064052
§ 371 (c)(1),
(2), (4) Date: Nov. 25, 2013

(87) PCT Pub. No.: WO2012/176264
PCT Pub. Date: Dec. 27, 2012

(65) Prior Publication Data
US 2014/0097671 A1    Apr. 10, 2014

(51) Int. Cl.
*B60L 13/03*    (2006.01)
*H01F 27/42*    (2006.01)
(Continued)

(52) U.S. Cl.
CPC .............. *B60L 11/182* (2013.01); *B60L 3/04* (2013.01); *B60L 11/1833* (2013.01); *B60L 11/1835* (2013.01); *H02J 7/025* (2013.01); *H02J 7/04* (2013.01); *H02J 17/00* (2013.01); *B60L 2250/10* (2013.01); *Y02T 10/7005* (2013.01); *Y02T 90/12* (2013.01); *Y02T 90/121* (2013.01);
(Continued)

(58) Field of Classification Search
CPC .............. B60L 11/182; B60L 11/1833; B60L 11/1835; B60L 3/04; B60L 2250/10; H02J 17/00; H02J 7/025; H02J 7/04; Y02T 10/7005; Y02T 90/12; Y02T 90/121; Y02T 90/122; Y02T 90/125; Y02T 90/14
USPC ............................ 307/9.1, 104, 108
See application file for complete search history.

(56) References Cited

U.S. PATENT DOCUMENTS 4,800,328 A * 1/1989 Bolger et al. ................. 320/106
5,573,090 A * 11/1996 Ross ............................. 191/10
(Continued)

FOREIGN PATENT DOCUMENTS

AU    2006269374 B2    1/2007
AU    2006269374 C1    1/2007
(Continued)

*Primary Examiner* — Rexford Barnie
*Assistant Examiner* — Elim Ortiz
(74) *Attorney, Agent, or Firm* — Oliff PLC

(57) ABSTRACT

A non-contact power receiving apparatus includes a power reception unit for receiving electric power from a power transmitting apparatus outside of a vehicle in a non-contact manner, and a control device for controlling the electric power transmission from the power transmitting apparatus. The control device controls the electric power transmission based on a monitoring result obtained by monitoring the surroundings of the vehicle, and a door state detection result obtained by detecting whether or not a door of the vehicle is open. The control device causes, if the door state detection result indicates that the door is open, the power transmitting apparatus to reduce the power of the electric power transmission, and controls the electric power transmission without using the monitoring result.

7 Claims, 15 Drawing Sheets

(51) Int. Cl.
  *B60L 11/18*  (2006.01)
  *B60L 3/04*  (2006.01)
  *H02J 7/02*  (2006.01)
  *H02J 7/04*  (2006.01)
  *H02J 17/00*  (2006.01)

(52) U.S. Cl.
  CPC ............ *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 5,594,317 A * | 1/1997 | Yeow et al. | 320/108 |
| 5,596,261 A * | 1/1997 | Suyama | 320/152 |
| 7,741,734 B2 | 6/2010 | Joannopoulos et al. | |
| 2007/0222542 A1 | 9/2007 | Joannopoulos et al. | |
| 2008/0278264 A1 | 11/2008 | Karalis et al. | |
| 2009/0085522 A1 | 4/2009 | Matsumoto | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0065344 A1 * | 3/2010 | Collings, III | 180/2.1 |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0237709 A1 * | 9/2010 | Hall et al. | 307/104 |
| 2010/0253152 A1 | 10/2010 | Karalis et al. | |
| 2010/0264745 A1 | 10/2010 | Karalis et al. | |
| 2010/0277121 A1 * | 11/2010 | Hall et al. | 320/108 |
| 2011/0074346 A1 * | 3/2011 | Hall et al. | 320/108 |
| 2011/0082612 A1 | 4/2011 | Ichikawa | |
| 2011/0181240 A1 * | 7/2011 | Baarman et al. | 320/108 |
| 2011/0270462 A1 | 11/2011 | Amano et al. | |
| 2012/0323423 A1 | 12/2012 | Nakamura et al. | |
| 2014/0165676 A1 * | 6/2014 | Inoue et al. | 70/256 |
| 2014/0167913 A1 * | 6/2014 | Morita | 340/5.61 |
| 2014/0285146 A1 * | 9/2014 | Huston et al. | 320/109 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2006-288034 A | 10/2006 |
| JP | A-2009-501510 | 1/2009 |
| JP | A-2009-089452 | 4/2009 |
| JP | A-2010-093957 | 4/2010 |
| JP | A-2010-119246 | 5/2010 |
| JP | 2010140451 A * | 6/2010 |
| JP | A-2010-140451 | 6/2010 |
| JP | A-2010-183813 | 8/2010 |
| JP | A-2010-252498 | 11/2010 |
| JP | 2011-188679 A | 9/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/052785 A1 | 5/2010 |

* cited by examiner

NON-CONTACT POWER RECEIVING APPARATUS, NON-CONTACT POWER TRANSMITTING APPARATUS, AND NON-CONTACT POWER TRANSMITTING/RECEIVING SYSTEM

TECHNICAL FIELD

The present invention relates to a non-contact power receiving apparatus, a non-contact power transmitting apparatus, and a non-contact power transmitting/receiving system.

BACKGROUND ART

In order to reduce emissions of carbon dioxide gas as a way to address global warming, there has been increasing development of vehicles configured such that a vehicle-mounted power storage device can be charged from outside, such as electric vehicles and plug-in hybrid vehicles.

Japanese Patent Laying-Open No. 2010-140451 (Patent Document 1) discloses monitoring the approach of an object by a sonar with regard to a charging device for a vehicle-mounted battery in a plug-in hybrid vehicle and an electric vehicle. When an object comes within a prescribed distance, this technique generates a warning signal, issues an audio warning with a horn or a light warning with illumination, starts recording image information from a camera, and communicates with an established mobile network through a vehicle-mounted communication device.

CITATION LIST

Patent Document

PTD 1: Japanese Patent Laying-Open No. 2010-140451
PTD 2: Japanese Patent Laying-Open No. 2010-119246

SUMMARY OF INVENTION

Technical Problem

Japanese Patent Laying-Open No. 2010-140451 mentioned above discusses a plug-in system, and provides no specific discussion of charging control utilizing a surroundings monitoring system and a foreign object detection system in a non-contact power feeding system.

In a non-contact power feeding system, electric power is transmitted using an electromagnetic field and the like. Although a non-contact power feeding system is designed in such a manner that it does not affect communication equipment and the like during power transmission, it is preferable to further ensure that the equipment is not affected. While it may be possible to stop power transmission or issue a warning when an intruding object is found as a result of monitoring the surroundings of a vehicle, if the results of monitoring the surroundings of the vehicle have low accuracy, power transmission will be stopped or a warning will be issued even when not required. There is thus room to study when the monitoring of the surroundings of a vehicle should be effected.

An object of the present invention is to provide a non-contact power receiving apparatus, a non-contact power transmitting apparatus, and a non-contact power transmitting/receiving system, with reduced adverse effect on communication equipment and the like during non-contact power transmission/reception.

Solution to Problem

In summary, the present invention is directed to a non-contact power receiving apparatus including a power reception unit for receiving electric power from a power transmitting apparatus outside of a vehicle in a non-contact manner, and a control device for controlling the electric power transmission from the power transmitting apparatus. The control device controls the electric power transmission based on a monitoring result obtained by monitoring the surroundings of the vehicle, and a door state detection result obtained by detecting whether or not a door of the vehicle is open. The control device causes, if the door state detection result indicates that the door is open, the power transmitting apparatus to reduce the power of the electric power transmission, and controls the electric power transmission without using the monitoring result.

Preferably, the power transmitting apparatus includes a power transmission unit for transmitting the electric power to the power reception unit in a non-contact manner. The control device causes a request to be made of the power transmitting apparatus to transmit prescribed electric power for making position adjustment between the power reception unit and the power transmission unit, and after the position adjustment is completed, causes a request to be made of the power transmitting apparatus to transmit electric power larger than the prescribed electric power and causes the start of detection of an object intruding into the surroundings of the vehicle based on the monitoring result, and causes issuance of a warning if the intruding object is detected.

More preferably, the control device causes the power transmitting apparatus to reduce the power of the electric power transmission if the intruding object is detected.

More preferably, the non-contact power receiving apparatus further includes a monitoring device for outputting the monitoring result to the control device, and a warning unit for issuing the warning in response to a command from the control device. The monitoring device includes one of a camera, a thermo camera, a sonar, an infrared sensor, and a weight sensor. The warning unit issues the warning by using one of a horn, an engine operating sound, a sound for notifying the surroundings of the existence of the vehicle, an air blowing sound, and blown air.

Preferably, the power transmitting apparatus and the power reception unit transmit and receive the electric power in a non-contact manner by electromagnetic field resonance.

In another aspect, the present invention is directed to a non-contact power transmitting apparatus including a power transmission unit for transmitting electric power to a power reception unit of a vehicle in a non-contact manner, and a control device for controlling the electric power transmission from the power transmission unit. The control device controls the electric power transmission based on a monitoring result obtained by monitoring the surroundings of the vehicle, and a door state detection result obtained by detecting whether or not a door of the vehicle is open. The control device causes, if the door state detection result indicates that the door is open, the power transmission unit to reduce the power of the electric power transmission, and controls the electric power transmission without using the monitoring result.

In still another aspect, the present invention is directed to a non-contact power transmitting/receiving system including a power transmission unit outside of a vehicle, a power reception unit mounted on the vehicle for receiving electric power from the power transmission unit in a non-contact manner, and a control device for controlling the electric power transmission from the power transmission unit. The control device controls the electric power transmission based on a monitoring result obtained by monitoring the surroundings of the vehicle, and a door state detection result obtained by detecting whether or not a door of the vehicle is open. The control device causes, if the door state detection result indicates that the door is open, the power transmission unit to reduce the power of the electric power transmission, and controls the electric power transmission without using the monitoring result.

Advantageous Effects of Invention

According to the present invention, the transmitted electric power for non-contact charge is reduced by appropriately using the detection result of a moving object and the detection result of the opening/closing of a door, thereby avoiding adverse effect on equipment and the like possessed by a person.

DESCRIPTION OF EMBODIMENTS

Figure 1:
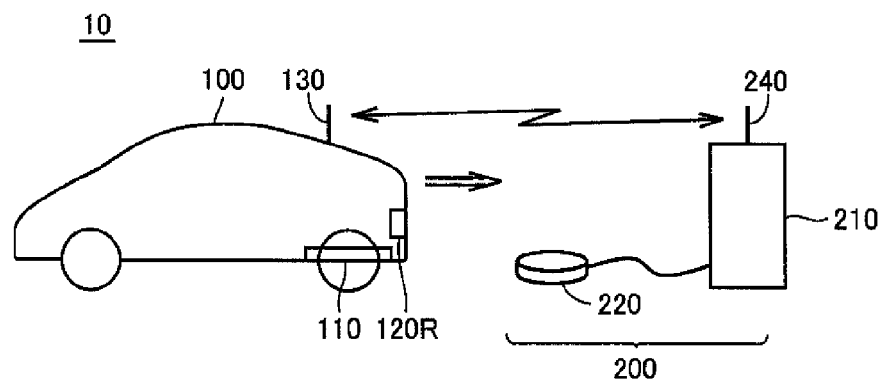
FIG. 1 is an overall configuration diagram of a vehicle power feeding system according to an embodiment of the present invention.

Embodiments of the present invention will be hereinafter described in detail with reference to the drawings, in which the same or corresponding elements are designated by the same reference characters, and description thereof will not be repeated.

First Embodiment

FIG. 1 is an overall configuration diagram of a vehicle power feeding system according to an embodiment of the present invention.

Referring to FIG. 1, a non-contact power transmitting/receiving system 10 includes a vehicle 100 and a power transmitting apparatus 200. Vehicle 100 includes a power reception unit 110, a camera 120R, and a communication unit 130.

Power reception unit 110 is installed on the floor of a vehicle body, and configured to receive electric power from a power transmission unit 220 of power transmitting apparatus 200 in a non-contact manner. Specifically, power reception unit 110 includes a self-resonant coil described later which resonates with a self-resonant coil provided in power transmission unit 220 through an electromagnetic field for receiving the electric power from power transmission unit 220 in a non-contact manner. Camera 120R is attached to the vehicle body so as to allow camera 120R to capture an image of the scene behind the vehicle. Communication unit 130 serves as a communication interface for establishing communication between vehicle 100 and power transmitting apparatus 200.

Power transmitting apparatus 200 includes a high-frequency power supply device 210, power transmission unit 220, and a communication unit 240. For example, high-frequency power supply device 210 converts commercial AC power supplied from a system power supply to high-frequency electric power, and outputs the power to power transmission unit 220. It is to be noted that the frequency of the high-frequency electric power generated by high-frequency power supply device 210 is, for example, 1 MHz to several tens of MHz.

Power transmission unit 220 is installed on the floor of parking space, and configured to transmit the high-frequency electric power from high-frequency power supply device 210 to power reception unit 110 of vehicle 100 in a non-contact manner. Specifically, power transmission unit 220 includes a self-resonant coil which resonates with the self-resonant coil provided in power reception unit 110 through the electromagnetic field for transmitting the electric power to power reception unit 110 in a non-contact manner. Communication unit 240 serves as a communication interface for establishing communication between power transmitting apparatus 200 and vehicle 100.

In this non-contact power transmitting/receiving system 10, the high-frequency electric power is supplied from power transmission unit 220 of power transmitting apparatus 200, and the self-resonant coil included in power reception unit 110 of vehicle 100 and the self-resonant coil included in power transmission unit 220 resonate with each other through the electromagnetic field, which causes power transmitting apparatus 200 to feed power to vehicle 100.

The non-contact power feeding method used for non-contact power transmitting/receiving system 10 according to this embodiment will now be described. In non-contact power transmitting/receiving system 10 according to this embodiment, the resonance method is used to feed power from power transmitting apparatus 200 to vehicle 100.

Figure 2:
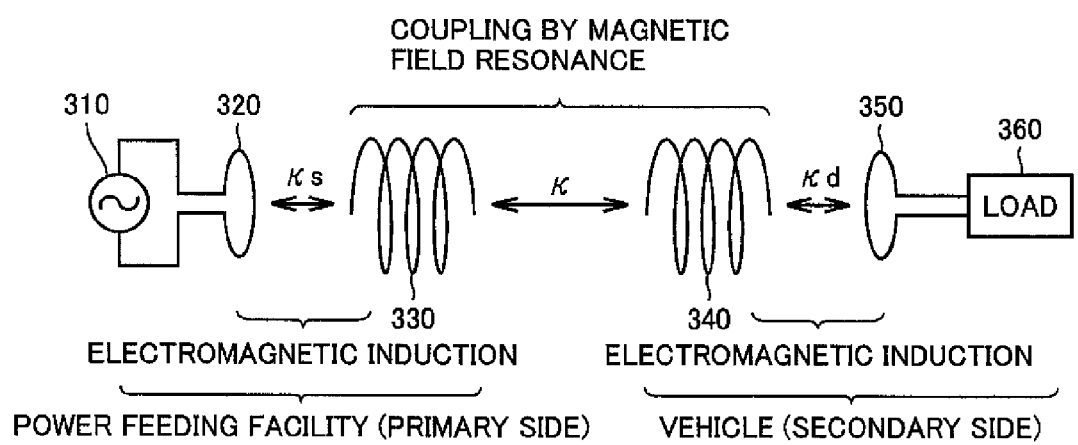
FIG. 2 is a diagram for illustrating the principle of power transmission by the resonance method.

FIG. 2 is a diagram for illustrating the principle of power transmission by the resonance method.

Referring to FIG. 2, according to this resonance method, as in the case where two tuning forks resonate with each other, two LC resonant coils having the same natural frequency resonate with each other in an electromagnetic field (near field), which causes electric power to be transmitted from one of the coils to the other coil through the electromagnetic field.

Specifically, a primary coil 320 is connected to a high-frequency power supply 310 to supply electric power having a high-frequency within a range from 1 M to several tens of MHz to a primary self-resonant coil 330 magnetically coupled to primary coil 320 by electromagnetic induction. Primary self-resonant coil 330 is an LC resonator consisting of an inductance of the coil itself and a stray capacitance, and resonates through an electromagnetic field (near field) with a secondary self-resonant coil 340 having the same resonance frequency as that of primary self-resonant coil 330. This causes the energy (electric power) to be transferred from primary self-resonant coil 330 through the electromagnetic field to secondary self-resonant coil 340. The energy (electric power) transferred to secondary self-resonant coil 340 is extracted by a secondary coil 350 magnetically coupled to secondary self-resonant coil 340 by electromagnetic induction, and supplied to a load 360. It is to be noted that the power transmission by the resonance method is implemented when a Q value showing the intensity of resonance between primary self-resonant coil 330 and secondary self-resonant coil 340 is greater than, for example, 100.

As compared to FIG. 1, secondary self-resonant coil 340 and secondary coil 350 correspond to power reception unit 110 in FIG. 1, and primary coil 320 and primary self-resonant coil 330 correspond to power transmission unit 220 in FIG. 1.

Figure 3:
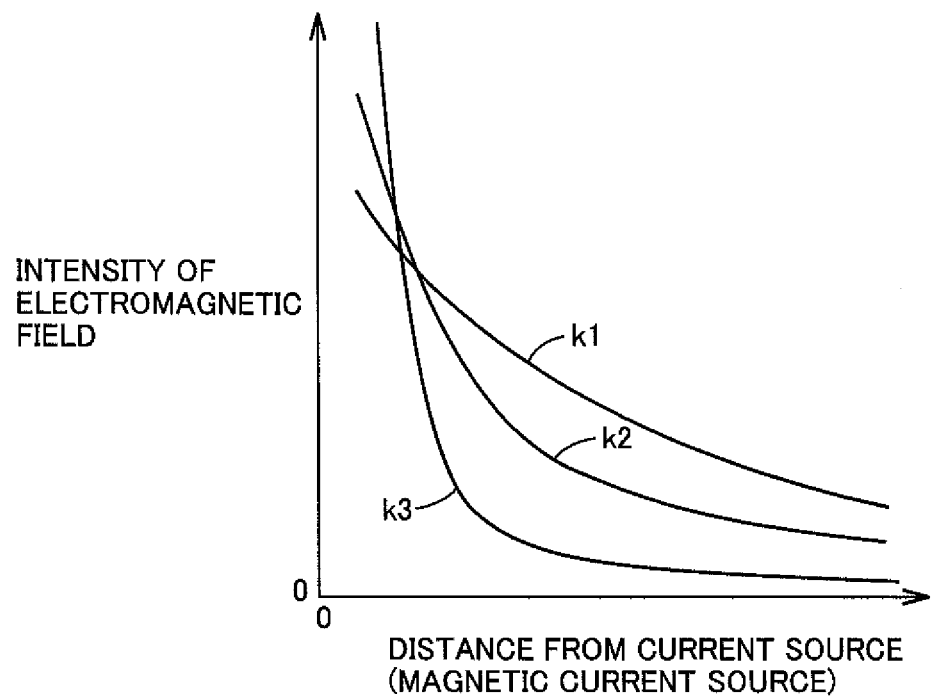
FIG. 3 is a diagram showing relation between the distance from a current source (magnetic current source) and the intensity of an electromagnetic field.

FIG. 3 is a diagram showing relation between the distance from a current source (magnetic current source) and the intensity of an electromagnetic field.

Referring to FIG. 3, the electromagnetic field includes three components. A curve k1 represents a component inversely proportional to the distance from the wave source and is referred to as a "radiation electromagnetic field." A curve k2 represents a component inversely proportional to the square of the distance from the wave source and is referred to as an "induction electromagnetic field." A curve k3 represents a component inversely proportional to the cube of the distance from the wave source and is referred to as an "electrostatic magnetic field."

Among others, there is a region where the intensity of electromagnetic wave sharply decreases in accordance with the distance from the wave source. In the resonance method, this near field (evanescent field) is used to transmit energy (electric power). In other words, the near field is used to cause resonance between a pair of resonators (for example, a pair of LC resonant coils) having the same natural frequency, to thereby transmit the energy (electric power) from one of the resonators (primary self-resonant coil) to the other resonator (secondary self-resonant coil). This near field does not allow propagation of the energy (electric power) over a long distance. Accordingly, as compared to the electromagnetic wave carrying the energy (electric power) by the "radiation electromagnetic field" allowing propagation of the energy over a long distance, the resonance method allows power transmission with reduced energy loss.

Figure 4:
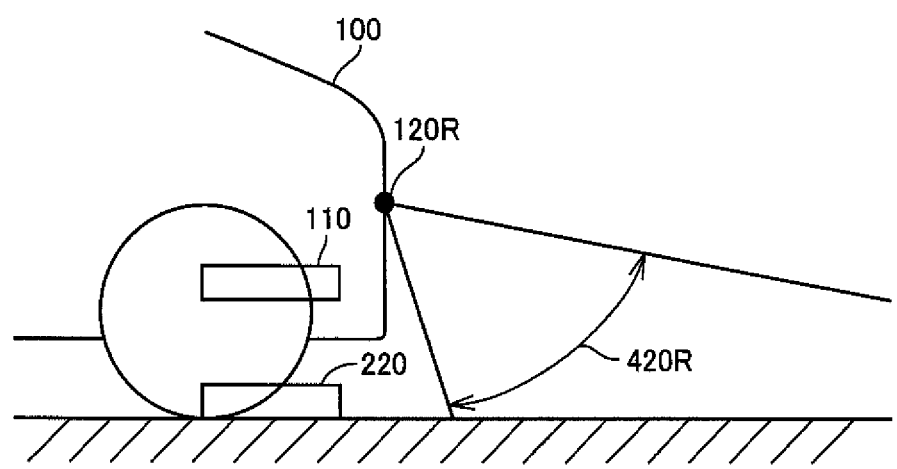
FIG. 4 is a diagram for illustrating positional relation between a camera 120R, a power reception unit 110, and a power transmission unit 220 shown in FIG. 1 during charge.

FIG. 4 is a diagram for illustrating positional relation between camera 120R, power reception unit 110, and power transmission unit 220 shown in FIG. 1 during charge.

Referring to FIG. 4, a driver recognizes general positional relation between the vehicle and power transmission unit 20 while looking at an image of camera 120R, and moves the vehicle to the vicinity of a parking position. Furthermore, weak electric power is transmitted and received between power transmission unit 220 and power reception unit 110 to determine whether or not the receiving power is equal to or higher than a predetermined value. Based on this information, the driver or a parking assist system determines the parking position of the vehicle.

In this manner, the position adjustment is made during charge, leading to a state where position mismatch between power transmission unit 220 and power reception unit 110 is small. The resonance method has a high tolerance for position mismatch during power reception. Thus, although not necessarily limited, the parking position is preferably adjusted in such a manner that power reception unit 110 is located immediately above power transmission unit 220. A camera or sonar monitors the surroundings of the vehicle during charge.

When a camera monitors the surroundings of the vehicle, for example, camera 120R monitors the surroundings of the vehicle. The approach of a moving object to the vehicle can be detected by camera 120R. Camera 120R monitors the area of a monitored region 420R. In addition to camera 120R for capturing an image of the scene behind the vehicle shown in FIG. 1, a plurality of cameras for monitoring the scenes ahead of, and on the right and left sides of the vehicle are provided on the vehicle. These plurality of cameras are responsible for their own monitored regions, respectively, so that the presence or absence of a moving object around the vehicle can be monitored by all of the plurality of cameras.

When a sonar monitors the surroundings of the vehicle, the monitoring is basically similar to that with the camera, with a monitored region and a blind spot. With the cameras, a moving object is detected by comparison of images of different times. That is, the presence or absence of intrusion and the direction of movement of the moving object can be recognized by taking the difference between images captured at intervals of a unit time.

With the sonars, on the other hand, the distance to the object can be detected by measurement of the time between the emission of ultrasonic wave from a sensor and the detection of reflected wave generated by the reflection of the ultrasonic wave off the object. If a dual sonar sensor with two microphones is used, the position of the object can be identified according to the principle of triangulation. Then, if the distance or position varies as a result of comparison between the detection results of different times, it can be recognized that the object is a moving object.

It is to be noted that sensors using infrared rays can be provided on the vehicle, in place of the cameras or sonars, to detect an intruding object.

A portion in close proximity to and almost in contact with the vehicle body, and a portion between the bottom of the vehicle and the ground are blind spots to the cameras or sonars. When a moving object has moved out of the frame of the monitored area, it can be determined whether the object has entered the vehicle or entered the blind spot in the monitored area, based on the opening/closing of a door and the like.

Figure 5:
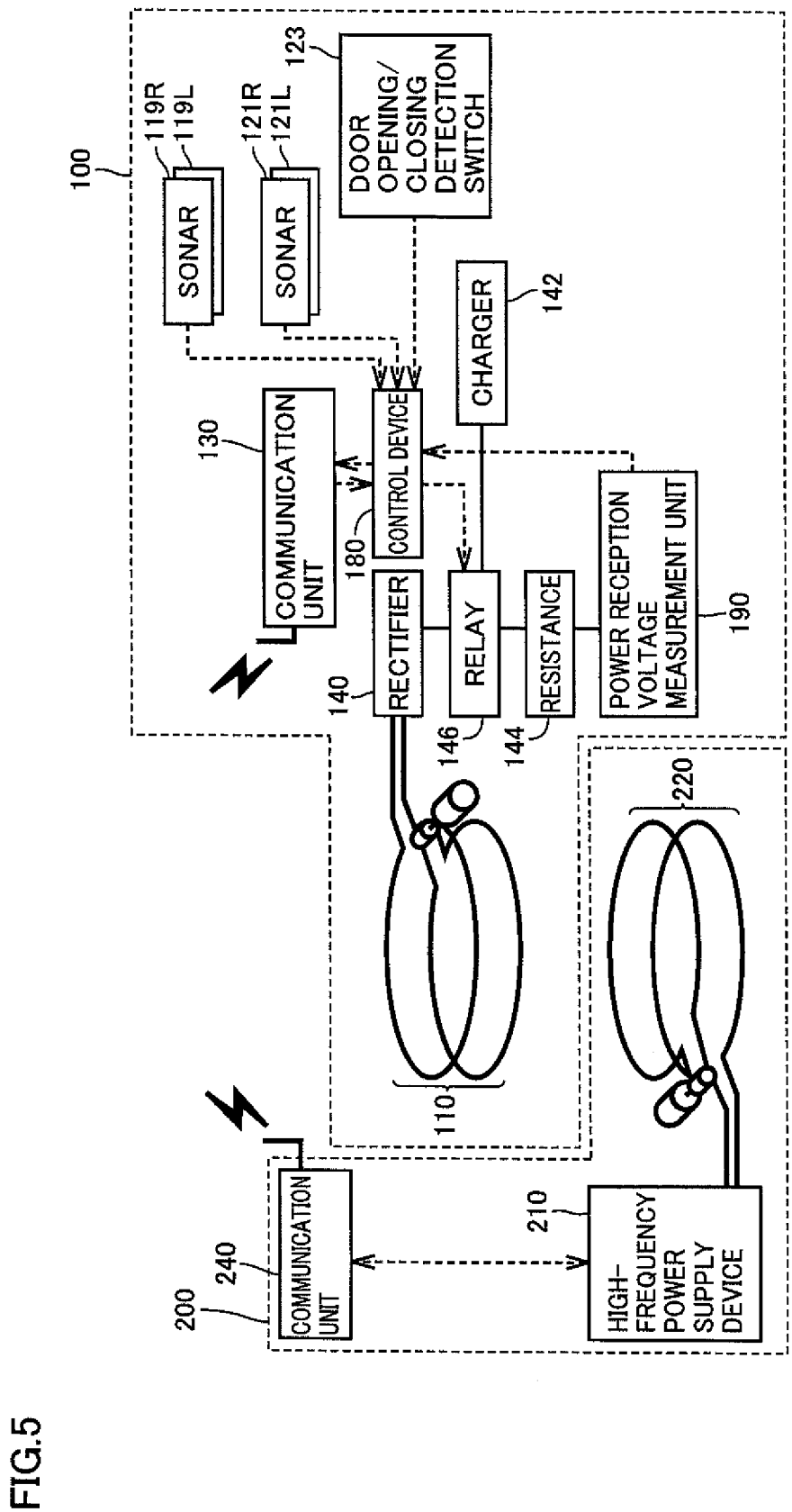
FIG. 5 is a diagram showing a general configuration with regard to power transmission/reception between a vehicle and a power feeding apparatus illustrated in a first embodiment.

FIG. 5 is a diagram showing a general configuration with regard to power transmission/reception between the vehicle and the power feeding apparatus described in the first embodiment.

Referring to FIG. 5, power transmitting apparatus 200 includes power transmission unit 220, high-frequency power supply device 210, and communication unit 240.

Vehicle 100 includes communication unit 130, power reception unit 110, a rectifier 140, a relay 146, a resistance 144, a power reception voltage measurement unit (voltage sensor) 190, a charger (DC/DC converter) 142 for charging a power storage device, sonars 119R, 119L, 121R and 121L for monitoring the surroundings of the vehicle, a door opening/closing detection switch 123, and a control device 180.

Communication unit 240 and communication unit 130 communicate wirelessly with each other to exchange information for making the position adjustment between power reception unit 110 and power transmission unit 220. By temporarily connecting resistance 144 via relay 146 to the output of the power transmission unit, voltage information that indicates whether or not a power reception condition is satisfied can be obtained from power reception voltage measurement unit 190. A request for transmission of weak electric power for obtaining this voltage information is transmitted from vehicle 100 to power transmitting apparatus 200 through communication units 130 and 240. When the position adjustment is completed, relay 146 is controlled such that it is turned off, so that resistance 144 does not affect the power reception. Substantial power transmission is then performed.

Figure 6:
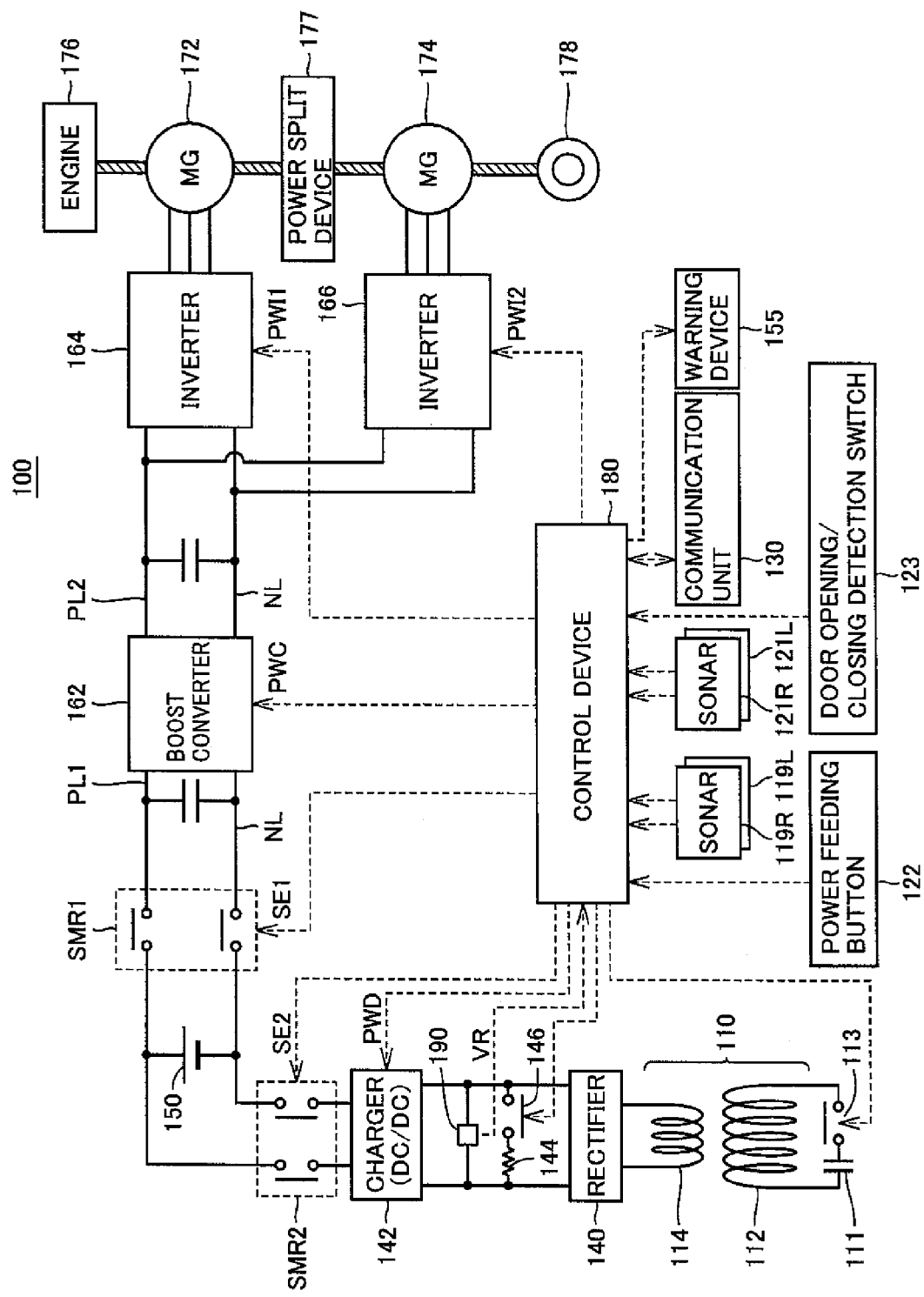
FIG. 6 is a configuration diagram showing the details of a vehicle 100 shown in FIGS. 1 and 5.

FIG. 6 is a configuration diagram showing the details of vehicle 100 shown in FIGS. 1 and 5.

Referring to FIG. 6, vehicle 100 includes a power storage device 150, a system main relay SMR1, a boost converter 162, inverters 164 and 166, motor generators 172 and 174, an engine 176, a power split device 177, and a drive wheel 178.

Vehicle 100 further includes a secondary self-resonant coil 112, a secondary coil 114, rectifier 140, DC/DC converter 142, a system main relay SMR2, and voltage sensor 190.

Vehicle 100 further includes control device 180, sonars 119R, 119L, 121R and 121L for monitoring the surroundings of the vehicle, a door opening/closing detection switch 123, communication unit 130, a power feeding button 122, and a warning device 155.

Vehicle 100 is equipped with engine 176 and motor generator 174 as a power source. Engine 176 and motor generators 172 and 174 are coupled to power split device 177. Vehicle 100 runs with a driving force generated by at least one of engine 176 and motor generator 174. The power generated by engine 176 is split by power split device 177 into two paths including a path through which the power is transmitted to drive wheel 178 and a path through which the power is transmitted to motor generator 172.

Motor generator 172 is an AC rotating electric machine including, for example, a three-phase AC synchronous electric motor provided with a rotor into which a permanent magnet is incorporated. Motor generator 172 generates electric power using kinetic energy of engine 176 split by power split device 177. For example, when the state of charge (also referred to as an "SOC") of power storage device 150 is reduced below a predetermined value, engine 176 is started and motor generator 172 generates electric power, to charge power storage device 150.

Motor generator 174 is also an AC rotating electric machine including, for example, a three-phase AC synchronous electric motor provided with a rotor into which a permanent magnet is incorporated, as with motor generator 172. Motor generator 174 generates a driving force using at least one of the electric power stored in power storage device 150 and the electric power generated by motor generator 172. The driving force of motor generator 174 is then transmitted to drive wheel 178.

Furthermore, during braking of the vehicle and during reduction in acceleration on a downwardly sloping surface, the dynamic energy stored in the vehicle as kinetic energy and potential energy is used for rotary drive of motor generator 174 through drive wheel 178, to cause motor generator 174 to operate as a power generator. Consequently, motor generator 174 operates as a regenerative brake for converting the running energy into electric power to generate a braking force. The electric power generated by motor generator 174 is then stored in power storage device 150.

Power split device 177 can use a planetary gear including a sun gear, pinion gears, a carrier, and a ring gear. The pinion gears engage with the sun gear and the ring gear. The carrier is coupled to the crankshaft of engine 176 while rotatably supporting the pinion gears. The sun gear is coupled to the rotation shaft of motor generator 172. The ring gear is coupled to the rotation shaft of motor generator 174 and drive wheel 178.

Power storage device 150 serves as a rechargeable DC power supply including, for example, a secondary battery such as lithium-ion or nickel-metal hydride secondary battery. Power storage device 150 stores the electric power supplied from DC/DC converter 142, and also stores the regenerative electric power generated by motor generators 172 and 174. Power storage device 150 then supplies the stored electric power to boost converter 162. It is to be noted that a large-capacity capacitor may also be employed as power storage device 150 and any power buffer may be used that can temporarily store the electric power supplied from power transmitting apparatus 200 (FIG. 1) and the regenerative electric power from motor generators 172 and 174, to supply the stored electric power to boost converter 162.

System main relay SMR1 is disposed between power storage device 150 and boost converter 162. System main relay SMR1 electrically connects power storage device 150 to boost converter 162 when a signal SE1 from control device 180 is activated, and interrupts the electric path between power storage device 150 and boost converter 162 when signal SE1 is deactivated. Based on a signal PWC from control device 180, boost converter 162 boosts the voltage on a positive electrode line PL2 to a voltage equal to or greater than the voltage output from power storage device 150. It is to be noted that boost converter 162 includes, for example, a DC chopper circuit.

Inverters 164 and 166 are provided corresponding to motor generators 172 and 174, respectively. Inverter 164 drives motor generator 172 based on a signal PWI1 from control device 180, and inverter 166 drives motor generator 174 based on a signal PWI2 from control device 180. It is to be noted that inverters 164 and 166 include, for example, a three-phase bridge circuit.

Secondary self-resonant coil 112 has both ends connected to a capacitor 111 through a switch (relay 113), and resonates with the primary resonant coil of power transmitting apparatus 200 through the electromagnetic field when the switch (relay 113) is rendered conductive. This resonance causes power transmitting apparatus 200 to supply the electric power. Although FIG. 6 shows an example in which capacitor 111 is provided, adjustment with respect to the primary self-resonant coil may be carried out so as to achieve resonance by stray capacitance of the coil, in place of the capacitor.

With regard to secondary self-resonant coil 112, the number of its turns is appropriately set so as to increase the distance to the primary self-resonant coil of power transmitting apparatus 200, and a Q value (for example, Q>100) showing the intensity of resonance between the primary self-resonant coil and secondary self-resonant coil 112, and to reduce κ showing the degree of coupling therebetween.

Secondary coil 114 is provided coaxially with secondary self-resonant coil 112 and can be magnetically coupled to secondary self-resonant coil 112 by electromagnetic induction. Secondary coil 114 extracts, by electromagnetic induction, the electric power supplied from secondary self-resonant coil 112 and outputs the electric power to rectifier 140. It is to be noted that secondary self-resonant coil 112 and secondary coil 114 form power reception unit 110 shown in FIG. 1.

Rectifier 140 rectifies the AC power extracted by secondary coil 114. Based on a signal PWD from control device 180, DC/DC converter 142 converts the electric power rectified by rectifier 140 into the voltage level of power storage device 150, and outputs the resultant to power storage device 150.

System main relay SMR2 is disposed between DC/DC converter 142 and power storage device 150. When a signal SE2 from control device 180 is activated, system main relay SMR2 electrically connects power storage device 150 to DC/DC converter 142. When signal SE2 is deactivated, system main relay SMR2 interrupts the electric path between power storage device 150 and DC/DC converter 142. Voltage sensor 190 detects a voltage VR between rectifier 140 and DC/DC converter 142, and outputs the detected value to control device 180.

Resistance 144 and relay 146 which are connected in series are provided between rectifier 140 and DC/DC converter 142. Relay 146 is controlled by control device 180 such that it is rendered conductive when the position of vehicle 100 is adjusted during non-contact power feeding.

Based on the accelerator pedal position, the vehicle speed and the signals from various sensors, control device 180 causes the generation of signals PWC, PWI1 and PWI2 for driving boost converter 162 and motor generators 172 and 174, respectively. Control device 180 causes the output of generated signals PWC, PWI1 and PWI2 to boost converter 162 and inverters 164 and 166, respectively. During the vehicle running, control device 180 causes the activation of signal SE1 to turn system main relay SMR1 on, and causes the deactivation of signal SE2 to turn system main relay SMR2 off.

Weak electric power can be transmitted before the transmission of charging large electric power, to determine a power reception state based on voltage VR. Accordingly, the driver or a vehicle guidance system adjusts the position of the vehicle based on voltage YR.

When the position adjustment of the vehicle is completed, control device 180 causes the transmission of a power transmission command to power transmitting apparatus 200 through communication unit 130, and causes the activation of signal SE2 to turn system main relay SMR2 on. Then, control device 180 causes the generation of signal PWD for driving DC/DC converter 142, and causes the output of generated signal PWD to DC/DC converter 142.

Furthermore, while the electric power is being supplied from power transmitting apparatus 200, control device 180 causes sonars 119R, 119L, 121R and 121L to monitor the surroundings of the vehicle. It is to be noted that in place of the sonars, monitoring devices such as monitoring cameras or infrared sensors that detect the presence or absence of a moving object in the monitored region by one of ultrasonic wave, electric wave and light may be used. Moreover, the movement of a person or an animal can be monitored without illumination during the night by using infrared cameras as the monitoring cameras.

After the approach of a moving object to the vehicle is detected, when the moving object has moved to a non-monitored region, control device 180 causes a determination to be made of whether the moving object has entered the vehicle or has moved to the blind spot in the monitored region by using an output from door opening/closing detection switch 123. In place of or in addition to the output from door opening/closing detection switch 123, an output from a sensor that detects a variation in vehicle weight or from a seating sensor may be used to make the determination. Then, control device 180 causes power transmitting apparatus 200 to continue the power transmission if it is detected that an occupant has entered the vehicle, and causes power transmitting apparatus 200 to stop the power transmission if it is not detected that an occupant has entered the vehicle.

In addition, when a moving object approaches the vehicle, control device 180 causes warning device 155 to issue a warning. As warning device 155, a horn, a light and the like may be used, or an engine operating sound or the like may alternatively be used.

Figure 7:
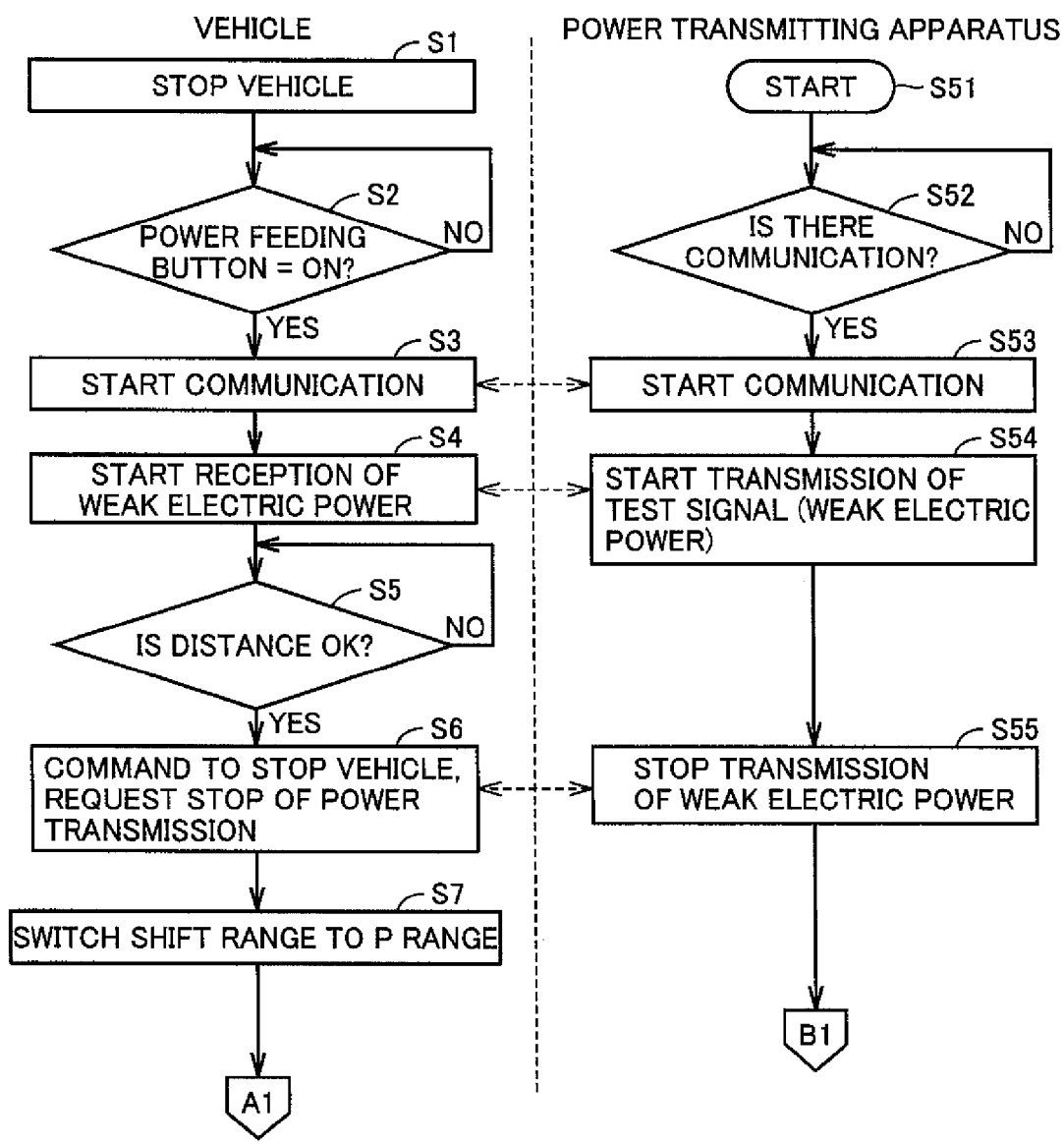
FIG. 7 is a flowchart (first half) for illustrating surroundings monitoring and power transmission control performed by a control device 180 shown in FIG. 6.

FIG. 7 is a flowchart (first half) for illustrating surroundings monitoring and power transmission control performed by control device 180 shown in FIG. 6.

Figure 8:
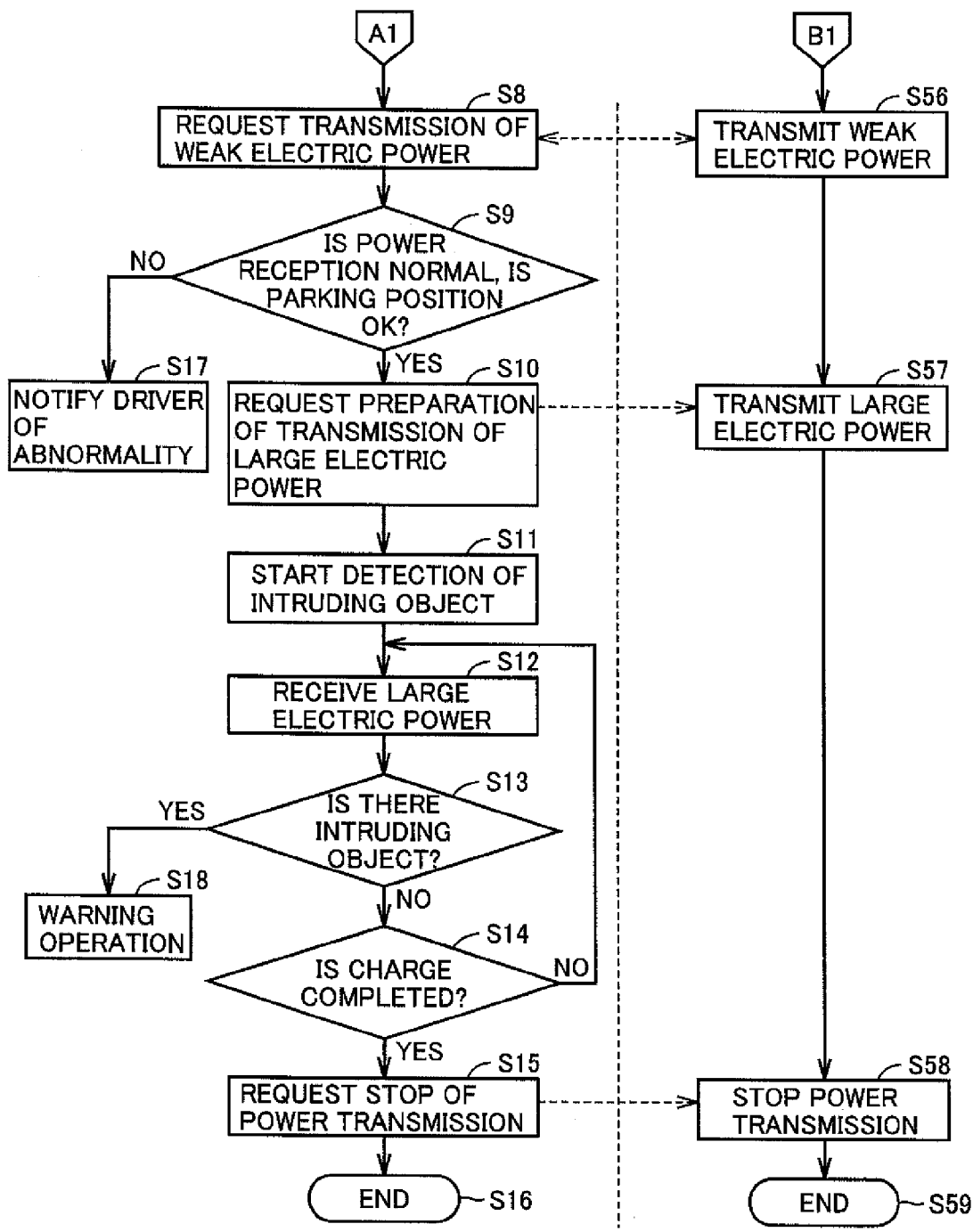
FIG. 8 is a flowchart (second half) for illustrating surroundings monitoring and power transmission control performed by control device 180 shown in FIG. 6.

FIG. 8 is a flowchart (second half) for illustrating surroundings monitoring and power transmission control performed by control device 180 shown in FIG. 6.

Referring to FIGS. 6 and 7, when the vehicle is stopped once in step S1 and it is detected in step S2 that power feeding button 122 has been pushed, in step S3, the vehicle starts communicating with the power feeding apparatus. In power transmitting apparatus 200, when the process is started in step S51, it is determined in step S52 whether there is communication from the vehicle. If it is detected that there is communication, the communication is started in step S53.

In vehicle 100, resistance 144 and relay 146 which are connected in series are provided between rectifier 140 and DC/DC converter 142. Relay 146 is controlled by control device 180 such that it is rendered conductive when the position of vehicle 100 is adjusted during non-contact power feeding.

Vehicle 100 requests power transmitting apparatus 200 to transmit a test signal for adjusting the position of power reception unit 110 to power transmission unit 220. In steps S4 and S54, the transmission/reception of weak electric power is started.

In step S5, control device 180 causes a determination to be made of a power reception state while monitoring voltage VR, to determine whether or not the distance between power reception unit 110 and power transmission unit 220 has fallen within a prescribed range.

Figure 9:
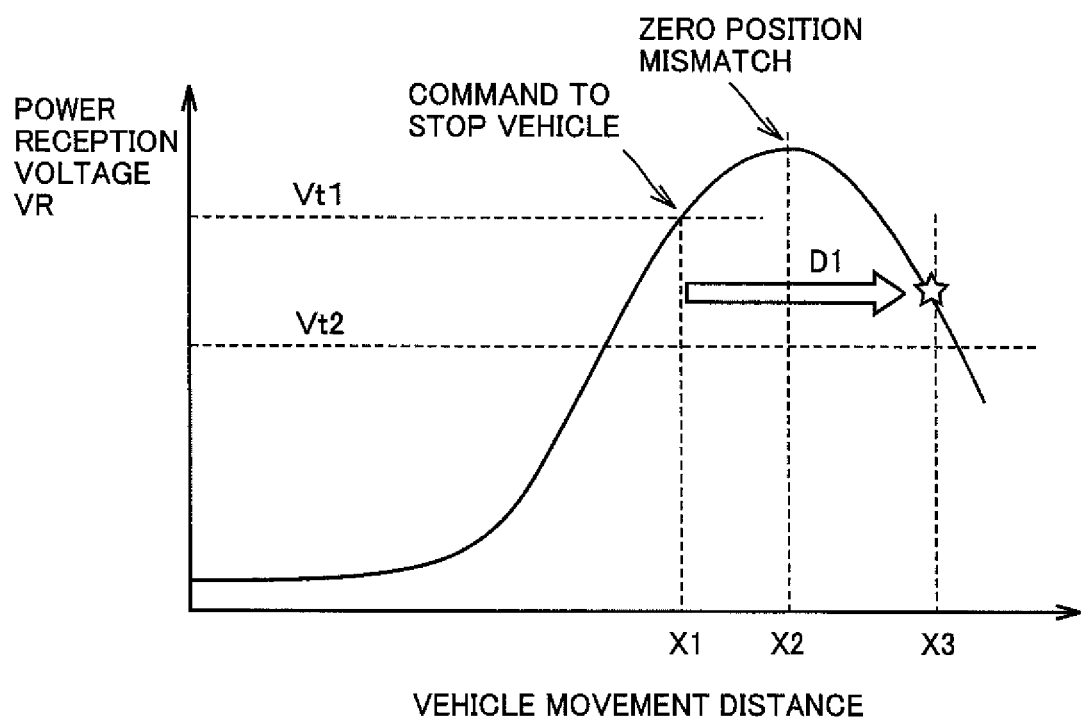
FIG. 9 is a diagram showing relation between a power reception voltage VR and a vehicle movement distance.

FIG. 9 is a diagram showing relation between power reception voltage VR and a vehicle movement distance. Referring to FIG. 9, power reception voltage VR increases as the vehicle movement distance approaches a position of zero position mismatch. Power reception voltage VR starts to decrease after the distance passes the position of zero position mismatch. A threshold value Vt1 is a determination threshold value at which a command to stop the vehicle is output to the vehicle, and is determined by calculating the relation between the distance and voltage in advance.

On the other hand, a threshold value Vt2 is a threshold value which is determined based on the intensity of electromagnetic field of allowable leakage during power transmission/reception with maximum output, and is lower than threshold value Vt1.

When the vehicle movement distance attains to a value X1 and power reception voltage VR attains to voltage Vt1, a command to stop the vehicle is transmitted to the parking assist system. Alternatively, the driver is notified of the parking position by the display of a command to stop the vehicle or by the sound of a command to stop the vehicle. Although the highest efficiency is attained when the vehicle movement distance attains to a value X2 where there is zero position mismatch, the vehicle movement distance attaining to a value X3 past value X2 is within an allowable range if power reception voltage YR is higher than voltage Vt2.

Referring again to FIGS. 6 and 7, if the power reception voltage is not equal to or higher than threshold value Vt1 in step S5, the processing of step S5 is repeated. Control device 180 causes, while repeating the determination of whether or not the power receiving coil (secondary self-resonant coil 112) is in a position capable of receiving the power from the power transmitting coil (the primary self-resonant coil in power transmission unit 220), a determination to be made of a direction in which the vehicle should be moved so as to arrange the power receiving coil in a position capable of receiving the power from the power transmitting coil, and causes the notification of the determined direction to be made to the parking assist system or the driver.

When the position adjustment is completed in step S5, in step S6, a command to stop the vehicle is transmitted to the parking assist system or the driver, and a request is made of power transmitting apparatus 200 to stop the power transmission. In response to the request to stop the power transmission, in step S55, power transmitting apparatus 200 stops the transmission of weak electric power. Then, in step S7, a shift range is switched to a P (parking) range in vehicle 100. Alternatively, in step S7, control device 180 waits until the driver switches the shift range to the P range.

Referring to FIGS. 6 and 8, when the switching to the P range is completed in step S7, in step S8, control device 180 of the vehicle causes a request to be made of power transmitting apparatus 200 to transmit weak electric power. In response to this request, in step S56, power transmitting apparatus 200 transmits weak electric power.

If the setting to the P range is confirmed in step S7, it is assumed that the vehicle will not move. It is desirable to confirm again whether or not the power transmission/reception can be normally performed in this stop position. Thus, in step S8, a request for transmission of weak electric power for a very short period of time (about one second) is made. Then, in step S9, it is determined whether or not the power reception can be normally performed and whether or not the parking position is OK, based on the determination of whether or not the power reception voltage is equal to or higher than threshold value Vt2 shown in FIG. 9 by control device 180.

If it is confirmed in step S9 that the power reception voltage is equal to or higher than threshold value Vt2 and that the power reception can be normally performed, the process proceeds to step S10 where control device 180 causes a request to be made of power transmitting apparatus 200 to transmit large electric power. If the power reception voltage is not equal to or higher than threshold value Vt2 and the power reception cannot be normally performed in step S9, on the other hand, the process proceeds to step S17 where the driver is notified of abnormality indicating that charge cannot be performed.

After the request is made of power transmitting apparatus 200 to transmit large electric power in step S10, in step S11, control device 180 causes the start of detection of an object intruding into the surroundings of the vehicle. An intruding object is detected using sonars 119R, 119L, 121R and 121L, or may be detected using monitoring cameras or infrared sensors.

In this manner, in the vehicle according to this embodiment, the detection of an intruding object is not performed during the detection of position mismatch, but is started after the parking position of the vehicle is determined. This is because, if the determination of a parking position and the detection of an intruding object are conducted simultaneously, surrounding objects seem to be moving when viewed from the vehicle during vehicle movement, thus requiring a complicated detection system for accurately detecting an intruding object.

It is also because, if an electromagnetic wave output from power transmitting apparatus 200 during the detection of the amount of position mismatch is set to be equal to or lower than a safety standard value for electromagnetic field in each country (e.g., equal to or lower than 7 W), the possibility of the electromagnetic wave affecting the communication equipment and the like decreases.

It is to be noted that the sonars, cameras for monitoring the scene behind the vehicle and the like that are used during the detection of the amount of position mismatch (during parking) can also be used as detection means for use in an intruding object detection system after the parking position is determined. This is desirable in terms of reducing the number of components and costs.

In response to the request for transmission of large electric from power to power transmitting apparatus 200 in step S10, in step S57, power transmitting apparatus 200 starts transmitting electric power larger than the weak electric power in step S56. In the vehicle, in step S12, relay 146 in FIG. 6 is controlled such that it is rendered non-conductive, system main relay SMR2 is controlled such that it is rendered conductive, and charger 142 starts charging power storage device 150 with the large electric power supplied from power transmitting apparatus 200.

In step S13, it is determined whether or not there is an intruding object. If an intruding object is detected, the process proceeds to step S18 where control device 180 causes the issuance of a warning to the surroundings. The warning is issued using one of a horn, an engine operating sound, and a sound for notifying the surroundings of the existence of the vehicle. Since a hybrid vehicle or an electric vehicle generates an extremely quiet running sound during low-speed running, a pedestrian or the like needs to be alerted. A function of producing a sound for notifying the surroundings of the existence of a vehicle, which is provided in some vehicle for this reason, may be used. In step S18, together with the warning, a request may be made of power transmitting apparatus 200 to reduce or stop the power transmission.

If an intruding object is not detected in step S13, the process proceeds to step S14. In step S14, control device 180 causes a determination to be made of whether or not the charge of power storage device 150 has been completed. This determination is made based on whether or not the state of charge SCO of power storage device 150 has attained to a target value, whether or not a scheduled charge time has passed, and the like.

If it is determined in step S14 that the charge has been completed, the process proceeds to step S15 where control device 180 causes a request to be made of power transmitting apparatus 200 to stop the power transmission. In step S16, the series of process ends. In step S58, power transmitting apparatus 200 accordingly stops the power transmission. In step S59, the series of process ends.

If the charge has not been completed in step S14, the process returns to step S12. In this case, the charge of power storage device 150 is continued while the monitoring of an intruding object around the vehicle is continued.

In this manner, in the first embodiment, if a moving object or the like is detected during charge by the non-contact power transmitting/receiving system of monitoring the surroundings by operating the monitoring device provided on the vehicle side, the power transmitting apparatus reduces (or stops) the transmitted electric power. This control is started only after the parking position is determined.

As a result, erroneous detection of an intruding object is prevented, and the approach of a moving object or the like to the vehicle can be detected during charge to reduce or stop the output appropriately.

[Modification of First Embodiment]

In this modification, the electric power is controlled using information about the opening/closing of a door.

Figure 10:
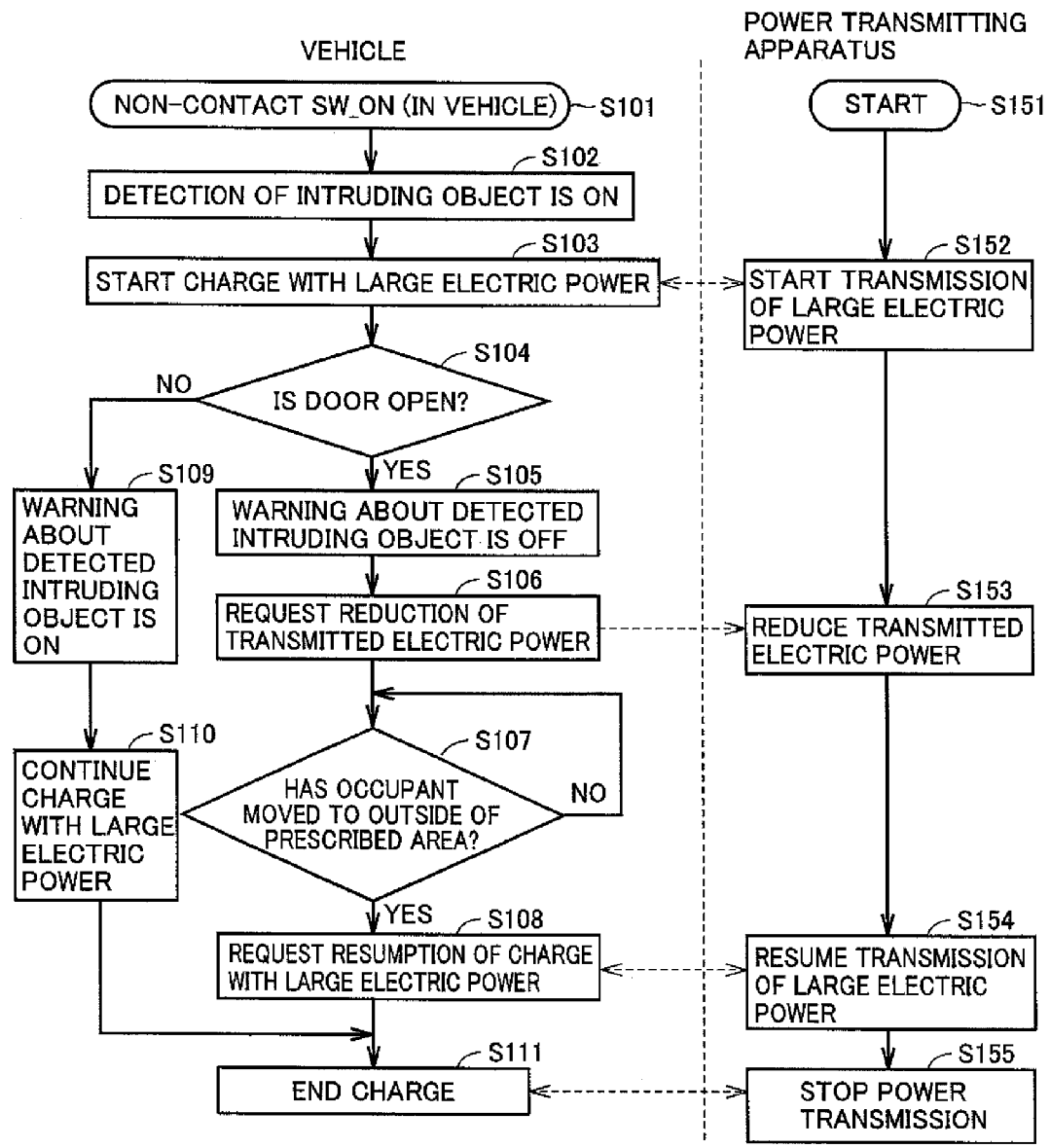
FIG. 10 is a flowchart for illustrating control of detection of an intruding object during exit from a vehicle.

FIG. 10 is a flowchart for illustrating control of detection of an intruding object during exit from a vehicle.

Referring to FIGS. 6 and 10, in the vehicle, when a switch indicating the start of non-contact charge (power feeding button 122 in FIG. 6) is turned on in step S101, the process proceeds to step S102 where a process of detecting an intruding object is started. Then, in step S103, the vehicle communicates with power transmitting apparatus 200 and requests power transmitting apparatus 200 to transmit large electric power.

In power transmitting apparatus 200, when the process is started in step S151, in step S152, power transmitting apparatus 200 receives the request for power transmission from vehicle 100 and starts transmitting large electric power. In vehicle 100, in step S103, charge with the large electric power is started.

During the charge, it is determined in step S104 whether or not a door of the vehicle is open. This determination is made by control device 180 based on an output from the door opening/closing switch in FIG. 6, the sonars, a change in images from the monitoring cameras, and the like.

If it is detected in step S104 that the door is open, the process proceeds to step S105. If it is not detected in step S104 that the door is open, the process proceeds to step S109.

In step S105, the control is changed so that a warning about an intruding object detected by the sonars is not provided. Then, in step S106, control device 180 causes a request to be made of power transmitting apparatus 200 to reduce the transmitted electric power. In response to this request, in step S153, power transmitting apparatus 200 reduces the transmitted electric power.

Figure 11:
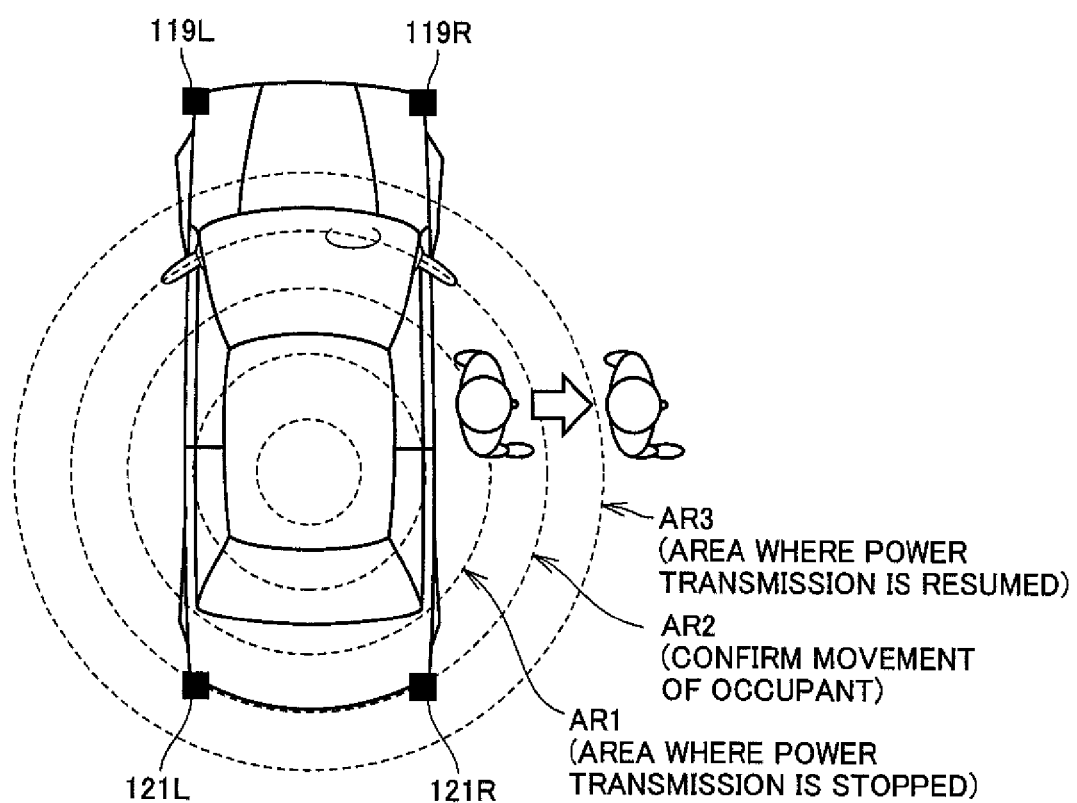
FIG. 11 is a diagram for illustrating the movement of an occupant after a door has been opened.

FIG. 11 is a diagram for illustrating the movement of an occupant after a door has been opened.

Referring to FIGS. 10 and 11, the function of issuing a warning about an intruding object is turned off in step S105, and the position of an occupant such as the driver is detected using sonars 119L, 119R, 121L and 121R. Control device 180 causes a change in the transmitted electric power based on the position of the occupant. If the occupant is detected within an area AR1, the power transmission is stopped or reduced. If the occupant moves to the outside of an area AR3, the power transmission is resumed or returned to normal output. An area AR2 represents an area where the movement of the occupant is tracked and confirmed.

When the transmitted electric power is reduced or stopped in step S106, it is determined in step S107 whether or not the occupant has moved to the outside of the prescribed area (area AR3). While the occupant is within the prescribed area, the position of the occupant is tracked in step S107. If it is detected in step S107 that the occupant has moved to the outside of the prescribed area, the process proceeds to step S108 where control device 180 causes a request to be made of power transmitting apparatus 200 to resume the transmission of large electric power. It is to be noted that the closing of the door may be added as a condition before making the request to resume the transmission of large electric power. In response to this request, in step S154, power transmitting apparatus 200 resumes the transmission of large electric power. In the vehicle, the charge with the large electric power is resumed.

If it is not detected in step S104 that the door is open, on the other hand, the process proceeds to step S109 where the control is performed in such a manner that a warning is provided upon detection of an intruding object. Then, in step S110, the charge with the large electric power is continued. Following step S110 or step S108, when the charge of power storage device 150 is completed in step S111, control device 180 causes a request to be made of the power transmitting apparatus to stop the power transmission. In response to this request, in step S155, power transmitting apparatus 200 stops the power transmission.

If non-contact charge is started with the occupant staying in the vehicle, and if the detection of an intruding object is started simultaneously with the start of the non-contact charge, the occupant will be detected as an intruding object during exit from the vehicle. A warning issued at this time will make the occupant feel uncomfortable.

In this modification of the embodiment, therefore, the control is performed such that the amount of transmitted electric power is reduced and a warning about a detected intruding object is not provided, with the opening of a door as a trigger.

If an output from the primary coil is set to be equal to or lower than a safety standard value for electromagnetic field (e.g., equal to or lower than 7 W), a problem does not arise even if there is an intruding object. Then, the device for detecting an intruding object is kept in operation, and the movement of the occupant is monitored by this device. The control is performed in such a manner that a warning is not provided during this time.

After the door has been opened, it is confirmed that the occupant has moved away from the vehicle, and the transmission of large electric power is resumed. Namely, it is confirmed that the occupant has moved away from the vehicle by the sonars and the like, and the transmission of large electric power is resumed when the occupant has moved away from the vehicle by at least a prescribed distance. It is to be noted that the closing of the door may be added as a condition before the resumption of the transmission of large electric power.

If an intruding object is detected during the transmission of large electric power, a warning is issued with a horn, an engine operating sound, a sound for notifying the surroundings of the existence of the vehicle, or the like.

As such, the detection of an intruding object can be successfully performed.

Second Embodiment

Although an example in which an intruding object is monitored on the vehicle side was described in the first embodiment, the monitoring of an intruding object and the control of transmitted electric power from the power transmitting apparatus may be performed on the power transmitting apparatus side provided in the parking space.

Figure 12:
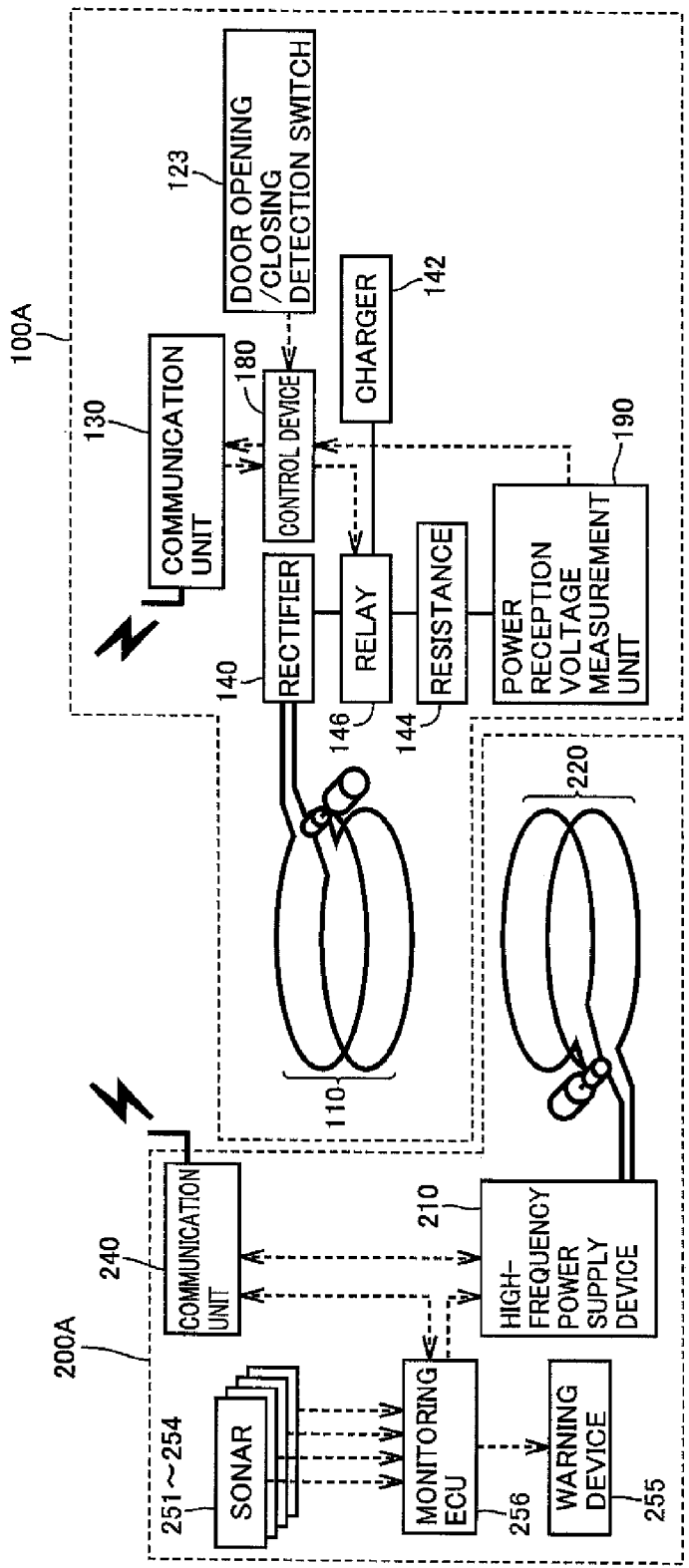
FIG. 12 is a diagram showing a general configuration with regard to power transmission/reception between a vehicle and a power feeding apparatus illustrated in a second embodiment.

FIG. 12 is a diagram showing a general configuration with regard to power transmission/reception between a vehicle and a power feeding apparatus illustrated in a second embodiment.

Referring to FIG. 12, a power transmitting apparatus 200A includes power transmission unit 220, high-frequency power supply device 210, communication unit 240, sonars 251 to 254 for monitoring the surroundings of the vehicle, a warning device 255, and a monitoring ECU 256.

A vehicle 100A includes communication unit 130, power reception unit 110, rectifier 140, relay 146, resistance 144, power reception voltage measurement unit (voltage sensor)

190, charger 142 for charging a power storage device, door opening/closing detection switch 123, and control device 180.

The configuration shown in FIG. 12 is different from the configuration shown in FIG. 5 in that vehicle 100A is not provided with sonars for monitoring the surroundings of the vehicle, and instead power transmitting apparatus 200A is provided with sonars 251 to 254 for monitoring the surroundings of the vehicle, monitoring ECU 256 for controlling the electric power transmitted from high-frequency power supply device 210 based on the outputs from sonars 251 to 254, and warning device 255 for issuing a warning about an intruding object.

It is to be noted that monitoring cameras or infrared sensors may be used in place of sonars 251 to 254.

Figure 13:
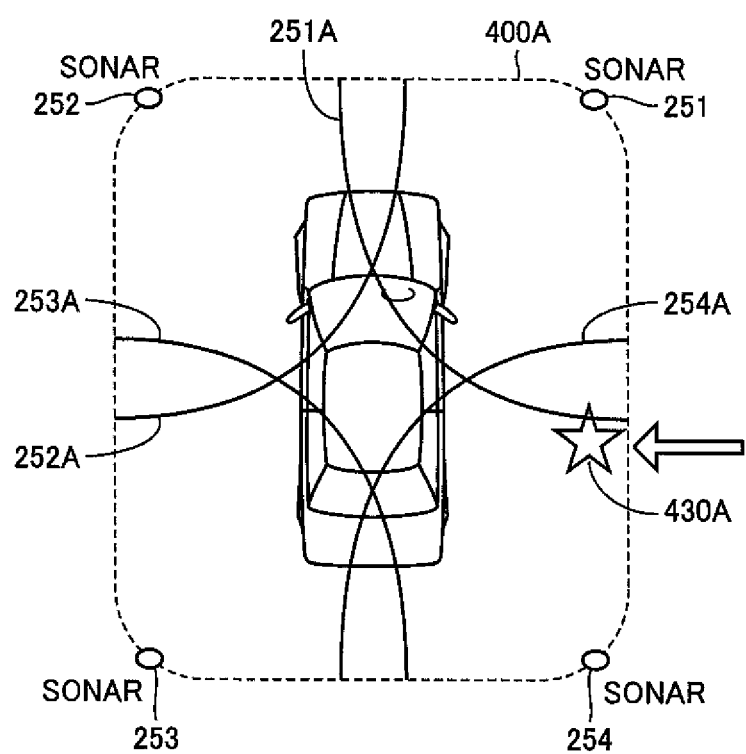
FIG. 13 is a diagram for illustrating regions monitored by sonars in the second embodiment.

FIG. 13 is a diagram for illustrating regions monitored by the sonars in the second embodiment.

Referring to FIGS. 12 and 13, power transmitting apparatus 200A is provided with sonars 251 to 254 arranged at the four corners of the monitored region.

A region monitored by sonar 251 is a region 251A, and a region monitored by sonar 252 is a region 252A. A region monitored by sonar 253 is a region 253A, and a region monitored by sonar 254 is a region 254A. A monitored region 400A around vehicle 100A is monitored by the four sonars.

When a moving object 430A intrudes into monitored region 400A, the intrusion and the direction of movement of the moving object can be recognized by taking the difference between detection results obtained at intervals of a unit time.

Although FIG. 13 shows an example in which four sonars are provided, a single sonar arranged on a ceiling may be used in the case where the parking space is provided with a ceiling of a certain height. Monitoring cameras or infrared sensors may be used in place of sonars 251 to 254.

When the monitoring device such as sonars is provided on the power transmitting apparatus side in this manner, in the control shown in FIGS. 7 and 8, the processing of steps. S11, S13 and S18 is performed on the power transmitting apparatus side between step S57 and step S58. In the control shown in FIG. 10, the processing of step S105 is performed on the power transmitting apparatus side after step S152, in response to the transmission of information that the door is open from the vehicle to the power transmitting apparatus. The processing of steps S107 and S108 is performed on the power transmitting apparatus side between step S153 and step S154. It is to be noted that the warning device provided in the vehicle used in the first embodiment may be used as warning device 255.

In this manner, in the second embodiment, if a moving object or the like is detected during charge by the non-contact power transmitting/receiving system of monitoring the surroundings by operating the monitoring device provided on the power transmitting apparatus not mounted on the vehicle, the power transmitting apparatus reduces (or stops) the power of the electric power transmission. This control is started only after the parking position is determined. While the door is open, the power of the electric power transmission is reduced (or stopped) without using the monitoring result or after the monitoring is interrupted.

As a result, erroneous detection of an intruding object is prevented, and the approach of a moving object or the like to the vehicle can be detected during charge to reduce or stop the output appropriately.

[Other Modifications of Monitoring Device of Intruding Object]

Figure 14:
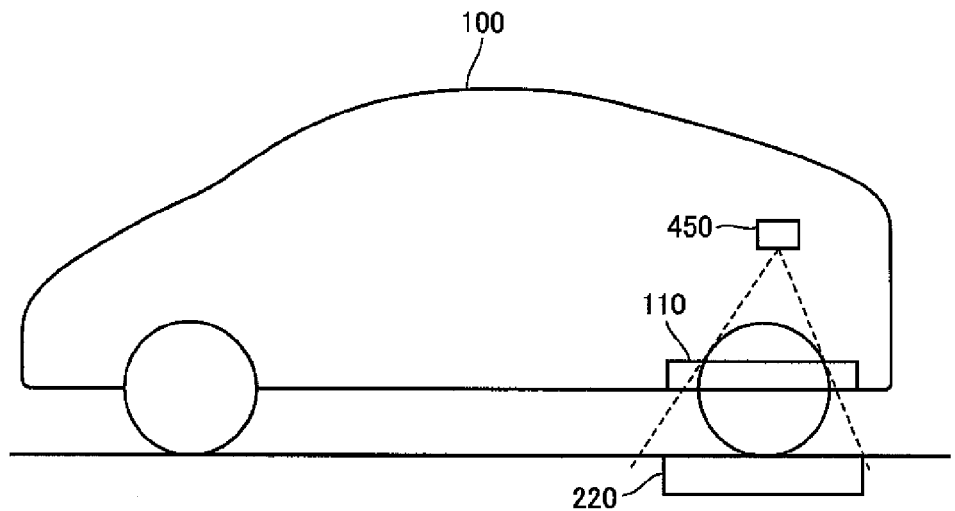
FIG. 14 is a diagram for illustrating a first modification of the monitoring device of an intruding object.

FIG. 14 is a diagram for illustrating a first modification of the monitoring device of an intruding object. As shown in FIG. 14, a thermo camera 450 may be provided on a side of vehicle 100 to detect the approach of a moving object to the vicinity of power transmission unit 220 and power reception unit 110. It is to be noted that thermo camera 450 is not necessarily required to be provided on the vehicle side, but may be arranged in such a manner as sonars 251 to 254 installed in the parking space as was described with reference to FIG. 13.

Thermo camera 450 may be used in place of, or in combination with, the cameras, sonars, infrared sensors and the like in the first or second embodiment.

Figure 15:
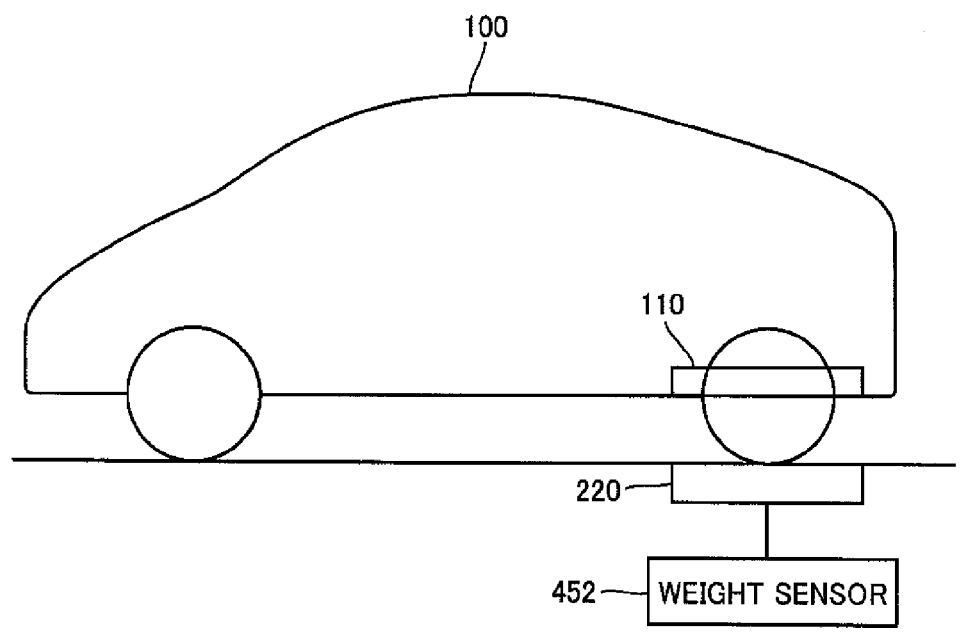
FIG. 15 is a diagram for illustrating a second modification of the monitoring device of an intruding object.

FIG. 15 is a diagram for illustrating a second modification of the monitoring device of an intruding object. As shown in FIG. 15, a weight sensor 452 is installed in the vicinity of power reception unit 220. When a moving object rests on power reception unit 220, a variation in weight is detected by weight sensor 452. It is to be noted that the weight sensor may be installed so as to detect a variation in weight of a region around the vehicle larger than power reception unit 220.

Weight sensor 452 may be used in place of, or in combination with, the cameras, sonars, infrared sensors and the like in the first or second embodiment. Alternatively, the weight sensor may be provided on the vehicle to act as a device of detecting an object intruding into the vicinity of the vehicle by detecting the exit of an occupant from the vehicle based on a variation in weight of the vehicle.

[Other Modifications of Warning Device about Intruding Object]

Although FIG. 6 shows an example in which the vehicle includes warning device 155 and FIG. 12 shows an example in which power transmitting apparatus 200A includes warning device 255, an air blowing device may be used as the warning device. The air blowing device is provided in the power reception unit of the vehicle or in the power transmission unit so as to cool the coil and remove foreign objects such as dust. An alert can be provided by changing the sound or wind of a fan.

Figure 16:
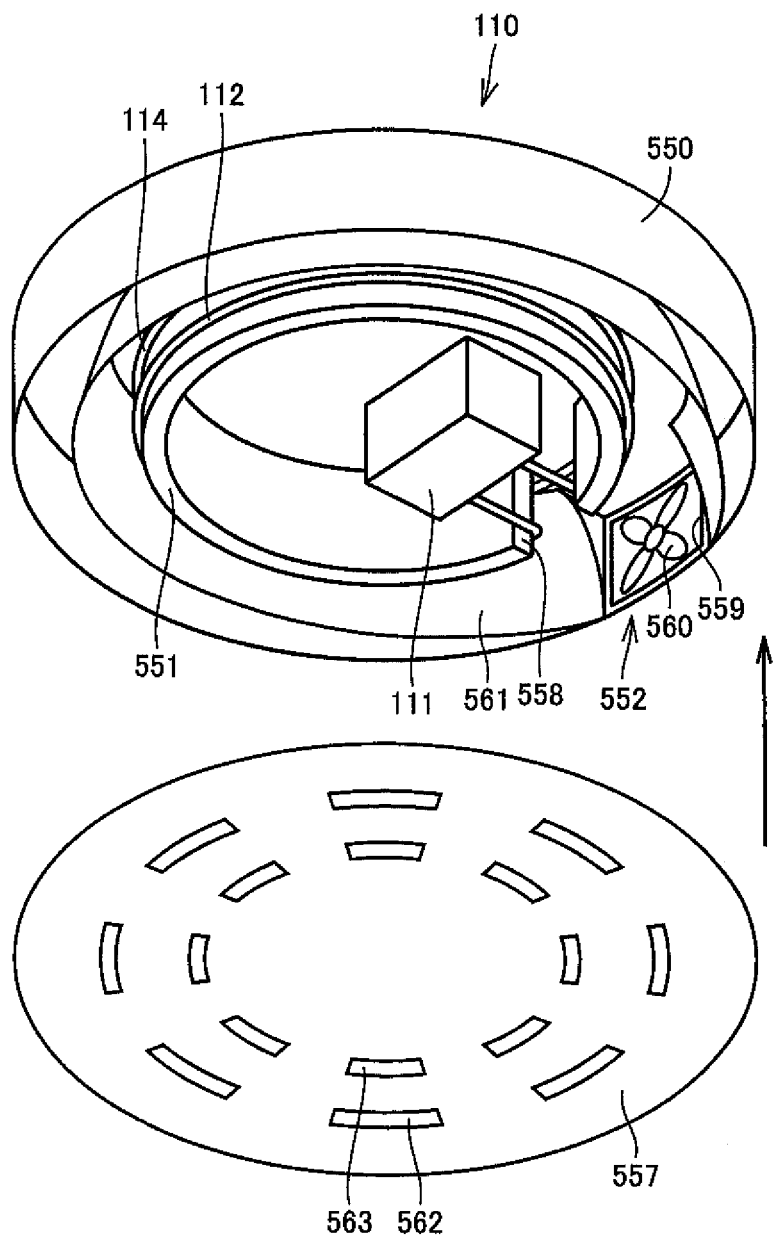
FIG. 16 is a perspective view showing the structure of an air blowing device provided on power reception unit 110 of the vehicle.

FIG. 16 is a perspective view showing the structure of an air blowing device provided on power reception unit 110 of the vehicle.

Figure 17:
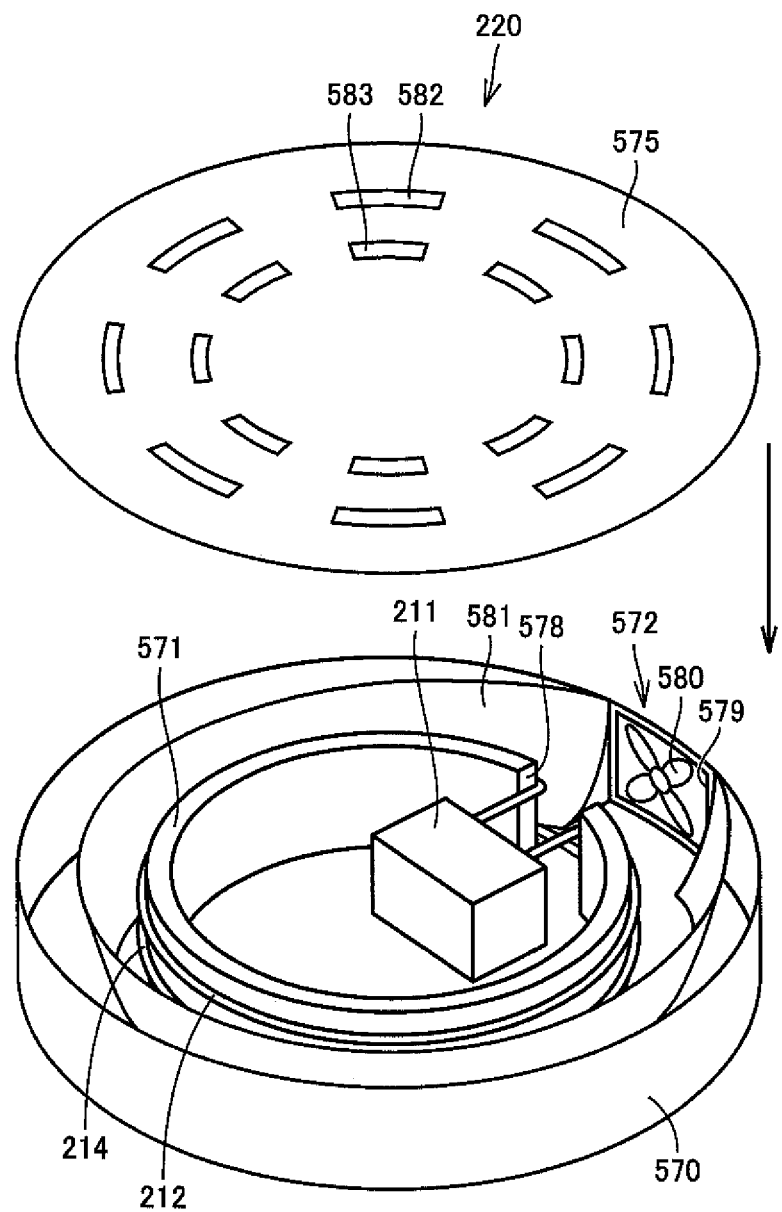
FIG. 17 is a perspective view showing the structure of an air blowing device provided on power transmission unit 220.

FIG. 17 is a perspective view showing the structure of an air blowing device provided on power transmission unit 220.

Figure 18:
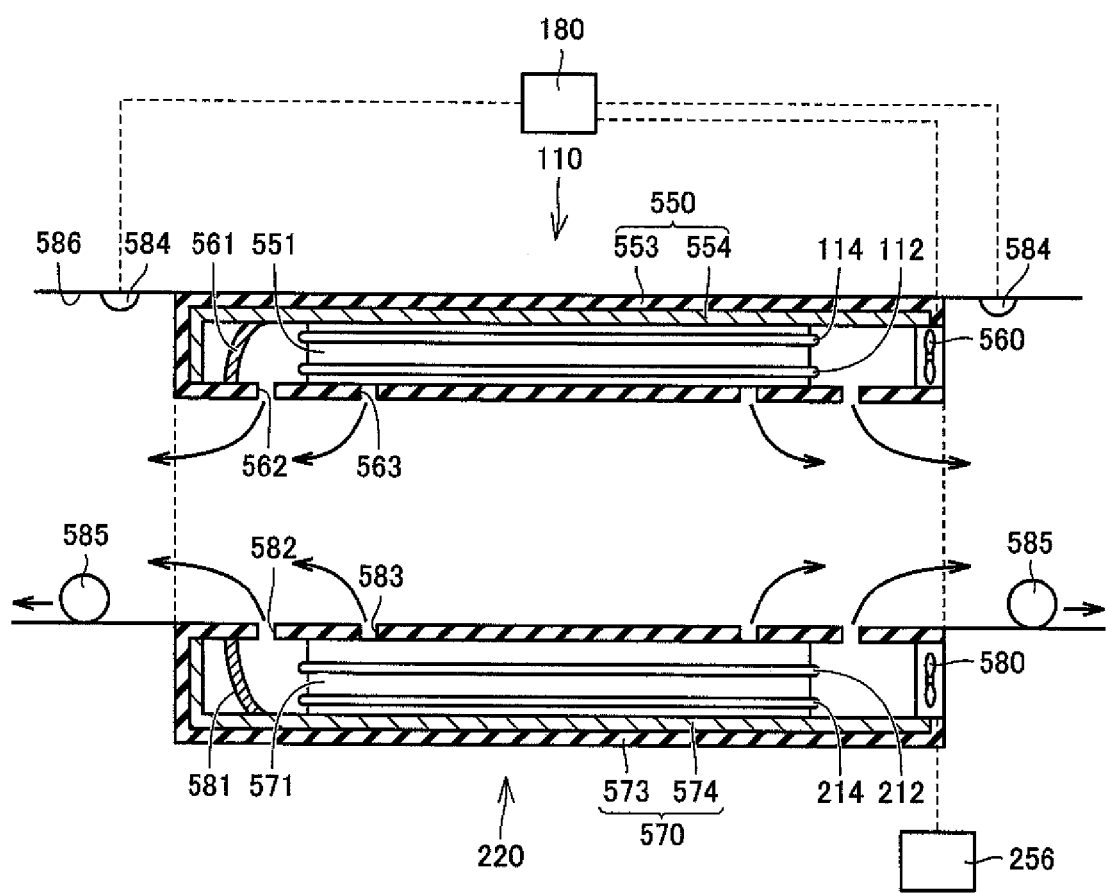
FIG. 18 is a cross-sectional view showing a flow of blown air when the power reception unit and the power transmission unit are provided opposite to each other.

FIG. 18 is a cross-sectional view showing a flow of blown air when the power reception unit and the power transmission unit are provided opposite to each other.

As shown in FIG. 16, power reception unit 110 on the vehicle side includes an enclosure 550, a coil support member 551 in a cylindrical shape contained in enclosure 550, secondary self-resonant coil 112 on the vehicle side and secondary coil 114 on the vehicle side mounted on coil support member 551, capacitor 111 on the vehicle side arranged within coil support member 551, and an air blowing device 552.

Referring to FIGS. 16 and 18, enclosure 550 includes a resin case 553, and a shielding member 554 provided on an inner circumferential surface of resin case 553. Resin case 553 is made of an insulating resin material. It is to be noted that enclosure 550 may be formed only of shielding member 554.

Resin case 553 includes a bottom wall portion 557. Shielding member 554 is not formed on bottom wall portion 557.

Coil support member 551 is formed in a cylindrical shape, with a hole portion 558 formed in a circumferential surface of coil support member 551.

Secondary self-resonant coil 112 on the vehicle side and secondary coil 114 on the vehicle side are mounted on an outer circumferential surface of coil support member 551, with secondary self-resonant coil 112 being connected to capacitor 111 via wiring. The wiring is connected to capacitor 111 through hole portion 558.

In FIG. 16, air blowing device 552 includes a hole portion 559 formed in a peripheral wall portion of enclosure 550, an air blower 560 fit in hole portion 559, a guide wall 561 arranged between coil support member 551 and an inner circumferential surface of enclosure 550, and a plurality of exhaust holes 562 and 563 formed in bottom wall portion 557.

In the peripheral wall portion of enclosure 550, hole portion 559 is formed in a portion opposite to hole portion 558. Air blower 560 supplies the air outside of enclosure 550 into enclosure 550.

Guide wall 561 is formed in a substantially annular shape, and is arranged between the outer circumferential surface of coil support member 551 and the inner circumferential surface of enclosure 550.

Formed between coil support member 551 and guide wall 561 is an air guiding passageway through which the air from air blower 560 can pass. Part of the air blown into power reception unit 110 on the vehicle side by air blower 560 passes through the air guiding passageway, thus cooling secondary self-resonant coil 112 on the vehicle side and secondary coil 114 on the vehicle side mounted on the outer circumferential surface of coil support member 551.

The air delivered into power reception unit 110 on the vehicle side by air blower 560 is delivered into coil support member 551 through hole portion 558, thus cooling capacitor 111.

In bottom wall portion 557, exhaust holes 562 are formed in a portion between guide wall 561 and coil support member 551, and the air delivered into the air guiding passageway is exhausted to the outside through exhaust holes 562. In bottom wall portion 557, exhaust holes 563 are formed in a portion on the inner side of coil support member 551, and the air delivered into coil support member 551 is exhausted to the outside through exhaust holes 563.

Referring to FIG. 17, power transmission unit 220 on the power transmitting apparatus side includes an enclosure 570, a coil support member 571 in a cylindrical shape contained in enclosure 570, a primary coil 214 on the power transmitting apparatus side and a primary self-resonant coil 212 on the power transmitting apparatus side mounted on coil support member 571, a capacitor 211 arranged within coil support member 571, and an air blowing device 572.

Referring to FIGS. 17 and 18, enclosure 570 includes a resin case 573, and a shielding member 574 provided on an inner circumferential surface of resin case 573. Resin case 573 is made of an insulating resin material. It is to be noted that enclosure 570 may be formed only of shielding member 574.

Resin case 573 includes a bottom wall portion 577. Shielding member 574 is not formed on a top board portion 575.

Coil support member 571 is formed in a cylindrical shape, with a hole portion 578 formed in a circumferential surface of coil support member 571.

Primary coil 214 on the power transmitting apparatus side and primary self-resonant coil 212 on the power transmitting apparatus side are mounted on an outer circumferential surface of coil support member 571, with primary self-resonant coil 212 on the power transmitting apparatus side being connected to capacitor 211 via wiring. The wiring is connected to capacitor 211 through hole portion 578.

Air blowing device 572 includes a hole portion 579 formed in a peripheral wall portion of enclosure 570, an air blower 580 fit in hole portion 579, a guide wall 581 arranged between coil support member 571 and an inner circumferential surface of enclosure 570, and exhaust holes 582 and exhaust holes 583 formed in top board portion 575.

In the peripheral wall portion of enclosure 570, hole portion 579 is formed in a portion opposite to hole portion 578. Air blower 580 supplies the air outside of enclosure 570 into enclosure 570.

Guide wall 581 is formed in a substantially annular shape, and is arranged between the outer circumferential surface of coil support member 571 and the inner circumferential surface of enclosure 570.

Formed between coil support member 571 and guide wall 581 is an air guiding passageway through which the air from air blower 580 can pass. Part of the air blown into power transmission unit 220 on the power transmitting apparatus side by air blower 580 passes through the air guiding passageway, thus cooling primary self-resonant coil 212 on the power transmitting apparatus side and primary coil 214 on the power transmitting apparatus side mounted on the outer circumferential surface of coil support member 571.

The air delivered into power transmission unit 220 on the power transmitting apparatus side by air blower 580 is delivered into coil support member 571 through hole portion 578, thus cooling capacitor 211.

In top board portion 575, exhaust holes 582 are formed in a portion between guide wall 581 and coil support member 571, and the air delivered into the air guiding passageway is exhausted to the outside through exhaust holes 582. In top board portion 575, exhaust holes 583 are formed in a portion on the inner side of coil support member 571, and the air delivered into coil support member 571 is exhausted to the outside through exhaust holes 583.

Referring to FIG. 18, the vehicle includes a floor panel 586 defining a bottom surface of the vehicle, power reception unit 110 on the vehicle side arranged on a lower surface of floor panel 586, and a sensor 584 provided on the lower surface of floor panel 586.

When transmitting the electric power from power transmission unit 220 on the power transmitting apparatus side to power reception unit 110 on the vehicle side, power reception unit 110 on the vehicle side and power transmission unit 220 on the power transmitting apparatus side are typically arranged opposite to each other.

Sensor 584 senses whether or not there is a foreign object 585 between power reception unit 110 on the vehicle side and power transmission unit 220 on the power transmitting apparatus side. It is to be noted that sensor 584 may be provided on power transmission apparatus 200.

Based on a signal from sensor 584, control device 180 causes a determination to be made of whether there is foreign object 585 between power reception unit 110 on the vehicle side and power transmission unit 220 on the power transmitting apparatus side.

If it is determined that there is foreign object 585 between power transmission unit 220 on the power transmitting apparatus side and power reception unit 110 on the vehicle side, control device 180 causes the activation of air blower 560. When air blower 560 is activated, the air is blown through exhaust holes 562 and 563 into a region between power reception unit 110 on the vehicle side and power transmission unit 220 on the power transmitting apparatus side.

If it is determined that there is foreign object 585 between power reception unit 110 on the vehicle side and power transmission unit 220 on the power transmitting apparatus side, control device 180 causes the transmission of a signal to monitoring ECU 256. Upon reception of the signal from control device 180, monitoring ECU 256 causes the activation of air blower 580.

When air blower 580 is activated, the air is blown through exhaust holes 582 and 583 into the region between power reception unit 110 on the vehicle side and power transmission unit 220 on the power transmitting apparatus side.

As a result, foreign object 585 lying between power reception unit 110 on the vehicle side and power transmission unit 220 on the power transmitting apparatus side is exhausted to the outside from the region between power reception unit 110 on the vehicle side and power transmission unit 220 on the power transmitting apparatus side.

Although FIG. 18 illustrates an example in which the air blowing device is provided on both power reception unit 110 on the vehicle side and power transmission unit 220 on the power transmitting apparatus side, the air blowing device is only required to be provided on at least one of power reception unit 110 on the vehicle side and power transmission unit 220 on the power transmitting apparatus side.

Such air blower provided on the power reception unit or power transmission unit may be operated as warning devices 155 and 255 in the first and second embodiments by control device 180 and monitoring ECU 256.

Although this embodiment shows an example in which the primary self-resonant coil, the primary coil, the secondary self-resonant coil and the secondary coil are included in FIGS. 2, 5, 6 and 12 and the like, the invention of the present application is not limited to such an arrangement but is applicable to an arrangement where power transmission between the secondary self-resonant coil and the secondary coil and power transmission between the primary coil and the primary self-resonant coil are not performed by electromagnetic induction. That is, the invention of the present application is applicable to any case where the resonance method is used for power reception by the vehicle and power transmission to the vehicle, and also to the case where a coil through which power transmission/reception is performed by electromagnetic induction is not provided on a path for power transmission/reception by the resonance method.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 10 non-contact power transmitting/receiving system; 100, 100A vehicle; 110 power reception unit; 111, 211 capacitor; 112, 340 secondary self-resonant coil; 113, 146 relay; 114, 350 secondary coil; 119L, 119R, 121L, 121R, 251 to 254 sonar; 122 power feeding button; 123 door opening/closing detection switch; 130, 240 communication unit; 140 rectifier; 142 charger; 144 resistance; 150 power storage device; 162 boost converter; 164, 166 inverter; 172, 174 motor generator; 176 engine; 177 power split device; 178 drive wheel; 180 control device; 190 power reception voltage measurement unit; 200, 200A power transmitting apparatus; 210 high-frequency power supply device; 220 power transmission unit; 212, 330 primary self-resonant coil; 155, 255 warning device; 310 high-frequency power supply; 214, 320 primary coil; 360 load; 400A, 420R monitored region; 430A moving object; 256 monitoring ECU; 450 thermo camera; 452 weight sensor; SMR1, SMR2 system main relay.

The invention claimed is:

1. A non-contact power receiving apparatus comprising: a power reception unit for receiving electric power from a power transmitting apparatus outside of a vehicle in a non-contact manner; and a control device for controlling the electric power transmission from said power transmitting apparatus, said control device controlling said electric power transmission based on a monitoring result obtained by monitoring the surroundings of said vehicle, and a door state detection result obtained by detecting whether or not a door of said vehicle is open, said control device causing, if said door state detection result indicates that said door is open, said power transmitting apparatus to reduce the power of said electric power transmission, and controlling said electric power transmission without using said monitoring result, wherein said power transmitting apparatus includes a power transmission unit for transmitting the electric power to said power reception unit in a non-contact manner, and said control device causes a request to be made of said power transmitting apparatus to transmit prescribed electric power for making position adjustment between said power reception unit and said power transmission unit, and after said position adjustment is completed and a parking position of the vehicle is fixed causes are request to be made of said power transmitting apparatus to transmit electric power larger than said prescribed electric power and causes the start of detection of an object intruding into the surroundings of the vehicle based on said monitoring result, and causes issuance of a warning if the intruding object is detected.

2. The non-contact power receiving apparatus according to claim 1, wherein said control device causes said power transmitting apparatus to reduce the power of said electric power transmission if said intruding object is detected.

3. The non-contact power receiving apparatus according to claim 2, further comprising: a monitoring device for outputting said monitoring result to said control device; and a warning unit for issuing said warning in response to a command from said control device, wherein said monitoring device includes one of a camera, a thermal camera, a sonar, an infrared sensor, and a weight sensor, and said warning unit issues the warning by using one of a horn, an engine operating sound, a sound for notifying the surroundings of the existence of the vehicle, an air blowing sound, and blown air.

4. The non-contact power receiving apparatus according to claim 1, wherein said power transmitting apparatus and said power reception unit transmit and receive the electric power in a non-contact manner by electromagnetic field resonance.

5. A non-contact power transmitting/receiving system comprising: a power transmission unit outside of a vehicle; a power reception unit mounted on said vehicle for receiving electric power from said power transmission unit in a non-contact manner;

and a control device for controlling the electric power transmission from said power transmission unit, said control device controlling said electric power transmission based on a monitoring result obtained by monitoring the surroundings of said vehicle, and a door state detection result obtained by detecting whether or not a door of said vehicle is open, said control device causing, if said door state detection result indicates that said door is open, said power transmission unit to reduce the power of said electric power transmission, and controlling said electric power transmission without using said monitoring result, wherein said power transmitting apparatus includes a power transmission unit for transmitting the electric power to said power reception unit in a non-contact manner, and said control device causes a request to be made of said power transmission unit to transmit prescribed electric power for making position adjustment between said power reception unit and said power transmission unit, and after said position adjustment is completed and a parking position of the vehicle is fixed, causes a request to be made of said power transmitting unit to transmit electric power larger than said prescribed electric power and causes the start of detection of an object intruding into the surroundings of the vehicle based on said monitoring result, and causes issuance of a warning if the intruding object is detected.

6. The non-contact power receiving apparatus according to claim 2, wherein said power transmitting apparatus and said power reception unit transmit and receive the electric power in a non-contact manner by electromagnetic field resonance.

7. The non-contact power receiving apparatus according to claim 3, wherein said power transmitting apparatus and said power reception unit transmit and receive the electric power in a non-contact manner by electromagnetic field resonance.

* * * * *